April 8, 1947.  R. B. JOHNSON  2,418,512
ARTILLERY TRAINING APPARATUS AND METHOD
Filed Sept. 8, 1944  20 Sheets-Sheet 1
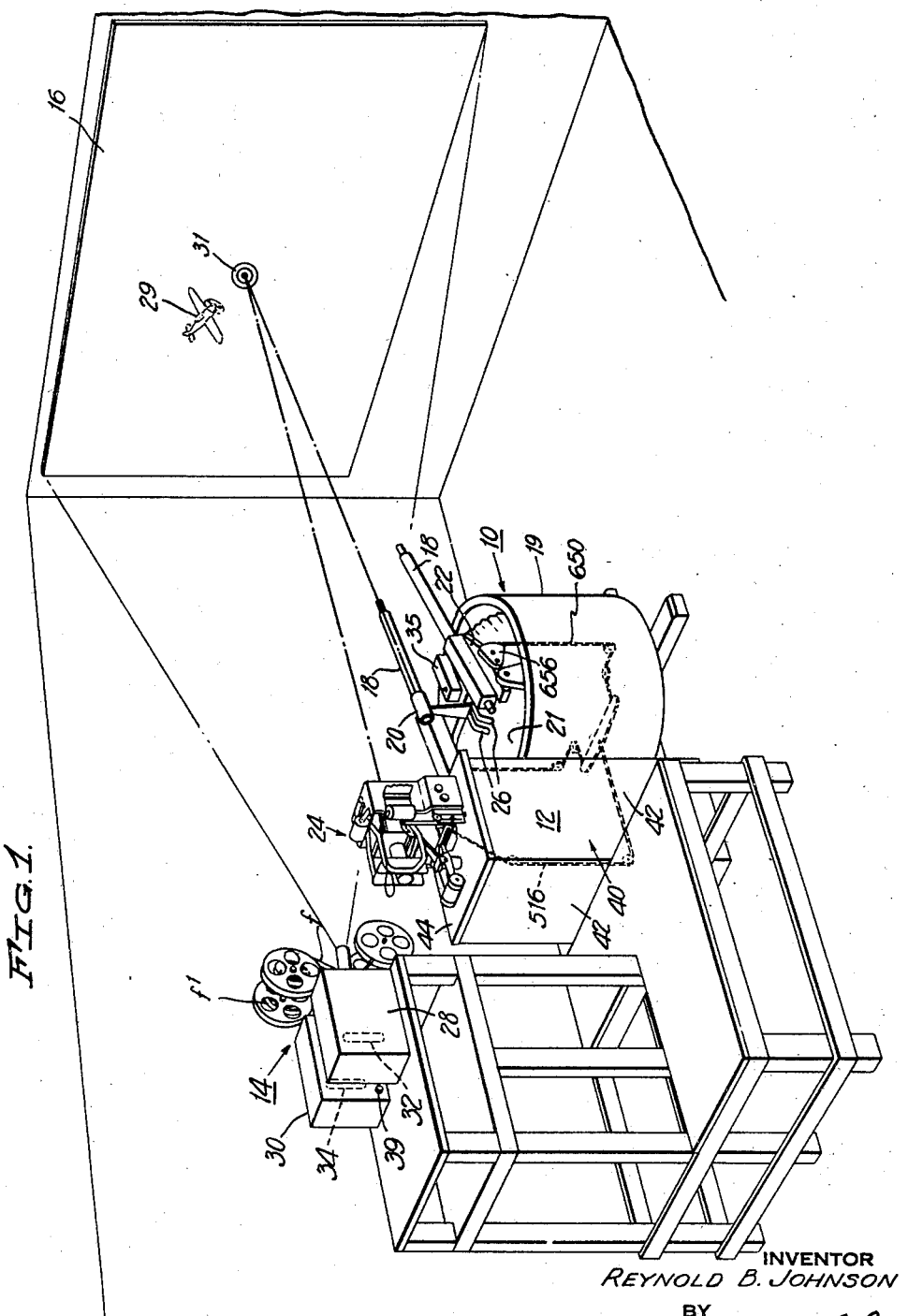
INVENTOR
REYNOLD B. JOHNSON
BY
ATTORNEY April 8, 1947.  R. B. JOHNSON  2,418,512
ARTILLERY TRAINING APPARATUS AND METHOD
Filed Sept. 8, 1944  20 Sheets-Sheet 2

INVENTOR
REYNOLD B. JOHNSON
BY
ATTORNEY

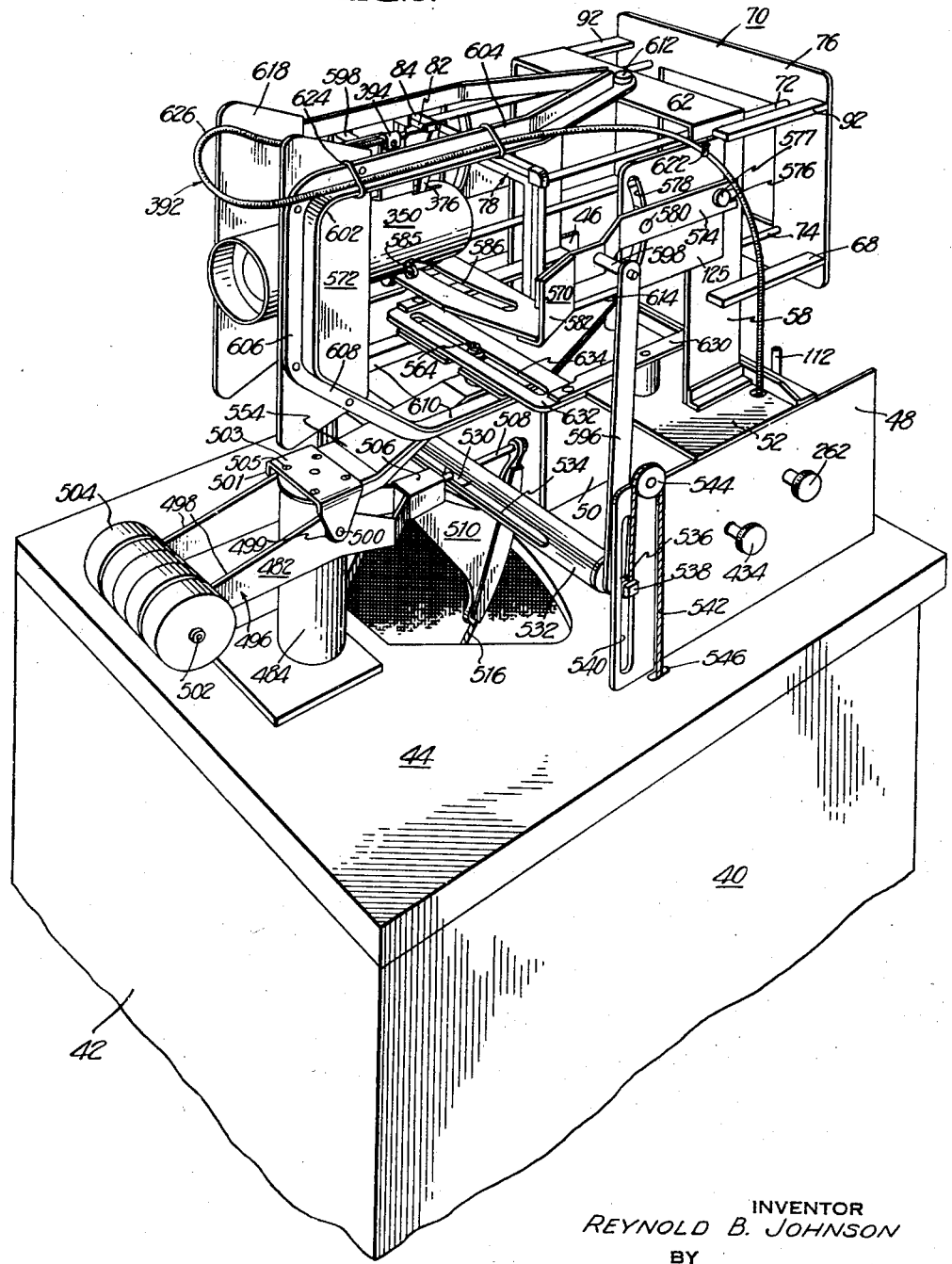

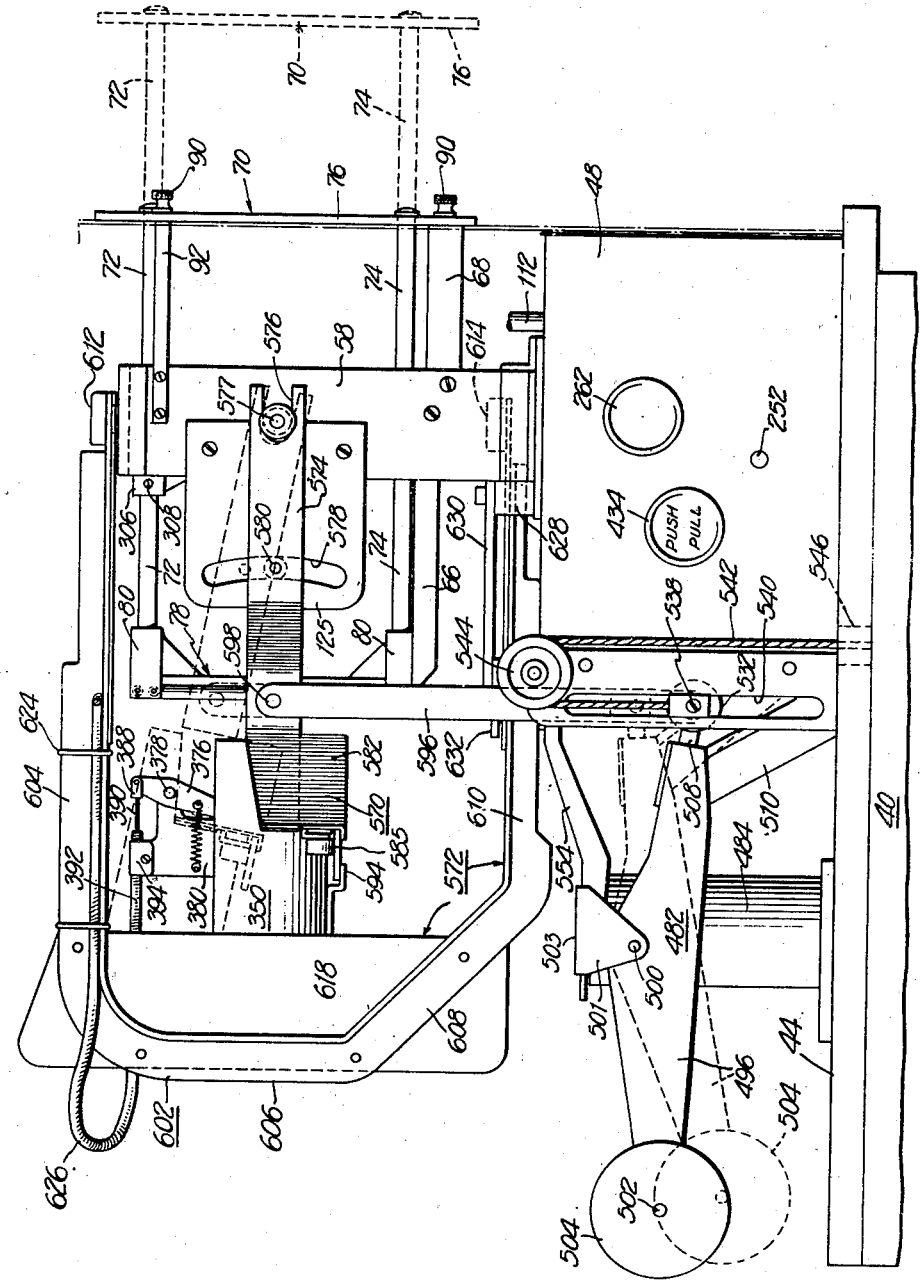

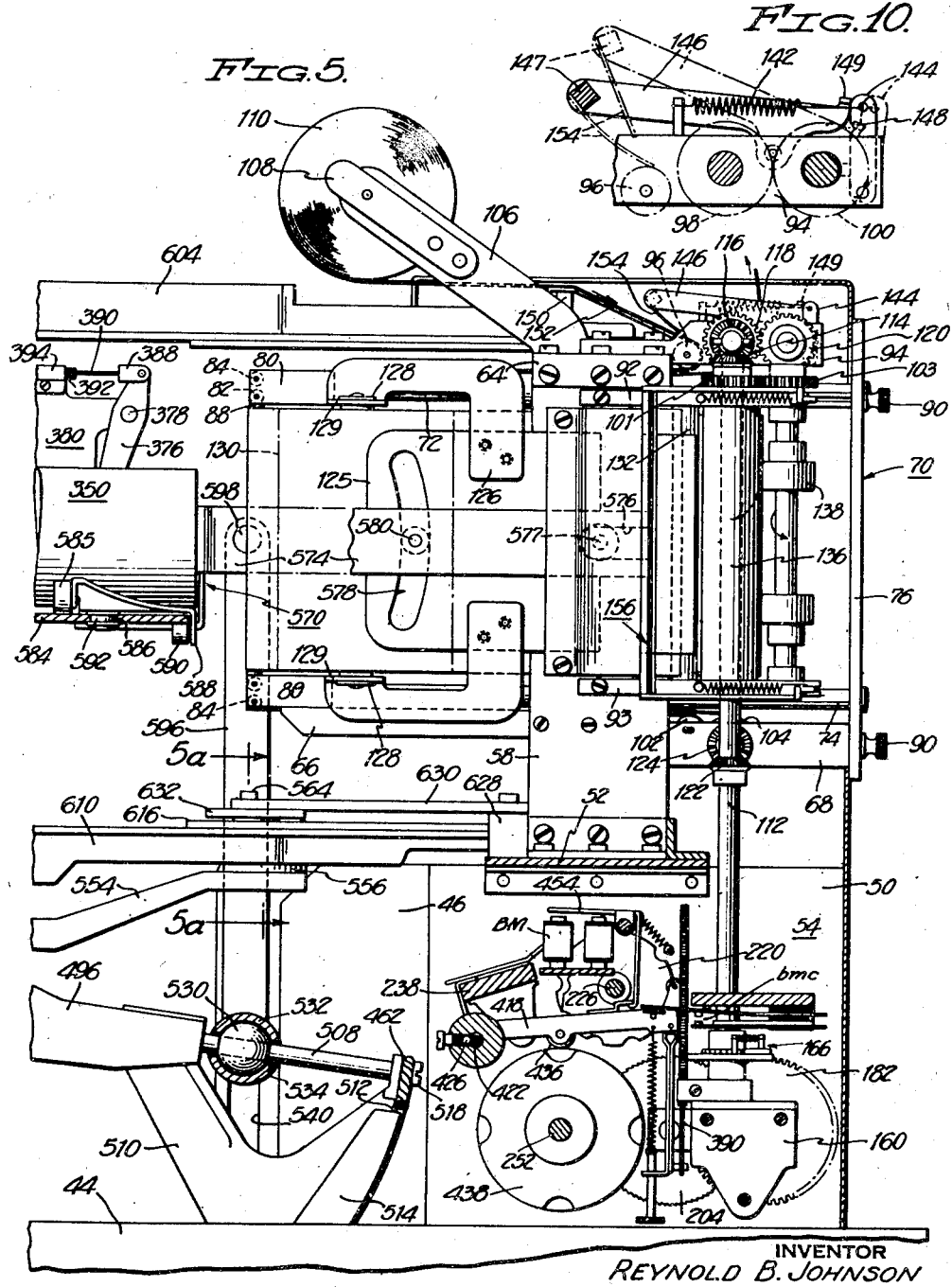

April 8, 1947.　　　　R. B. JOHNSON　　　　2,418,512
ARTILLERY TRAINING APPARATUS AND METHOD
Filed Sept. 8, 1944　　　20 Sheets-Sheet 6

INVENTOR
REYNOLD B. JOHNSON
BY
ATTORNEY

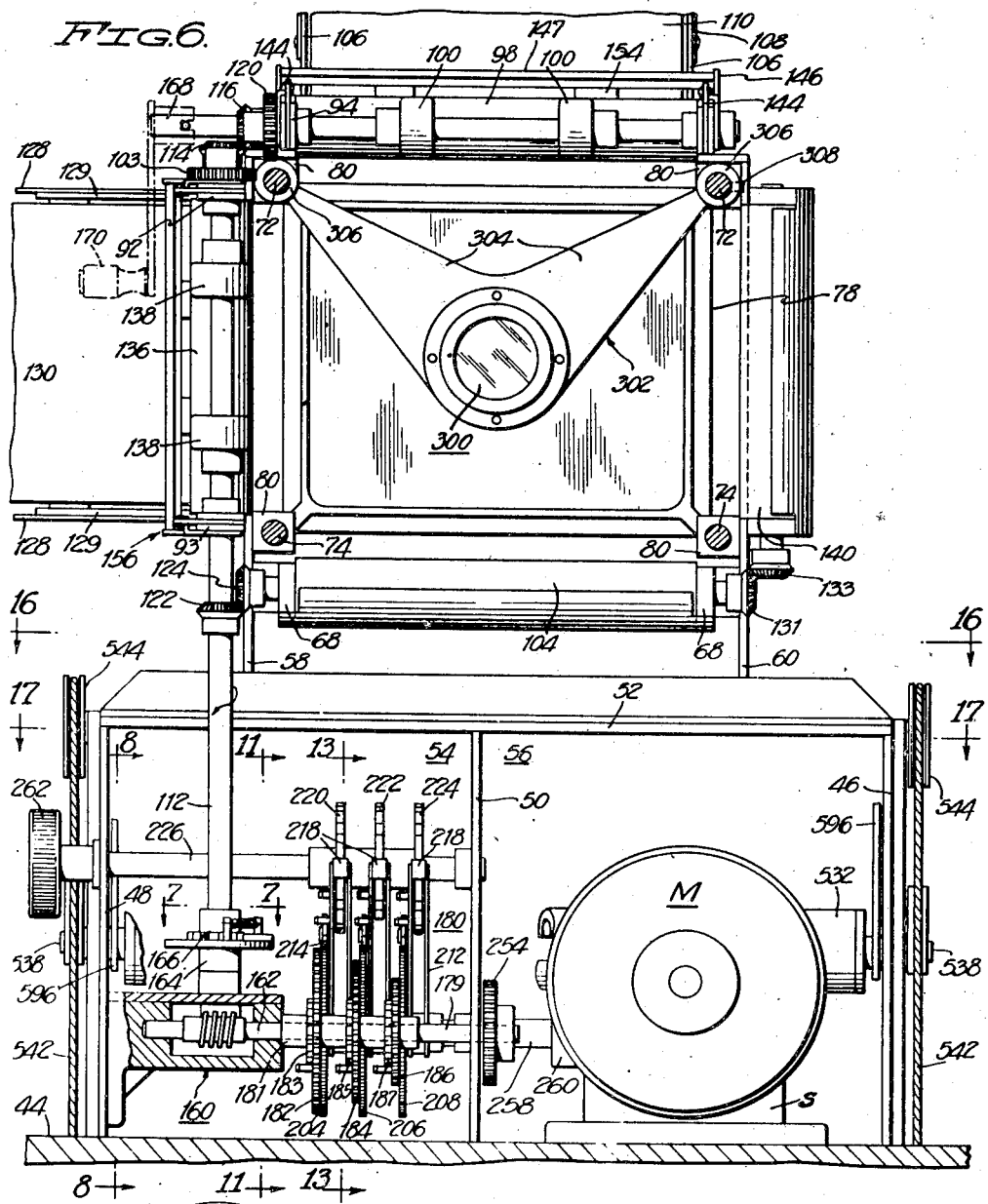

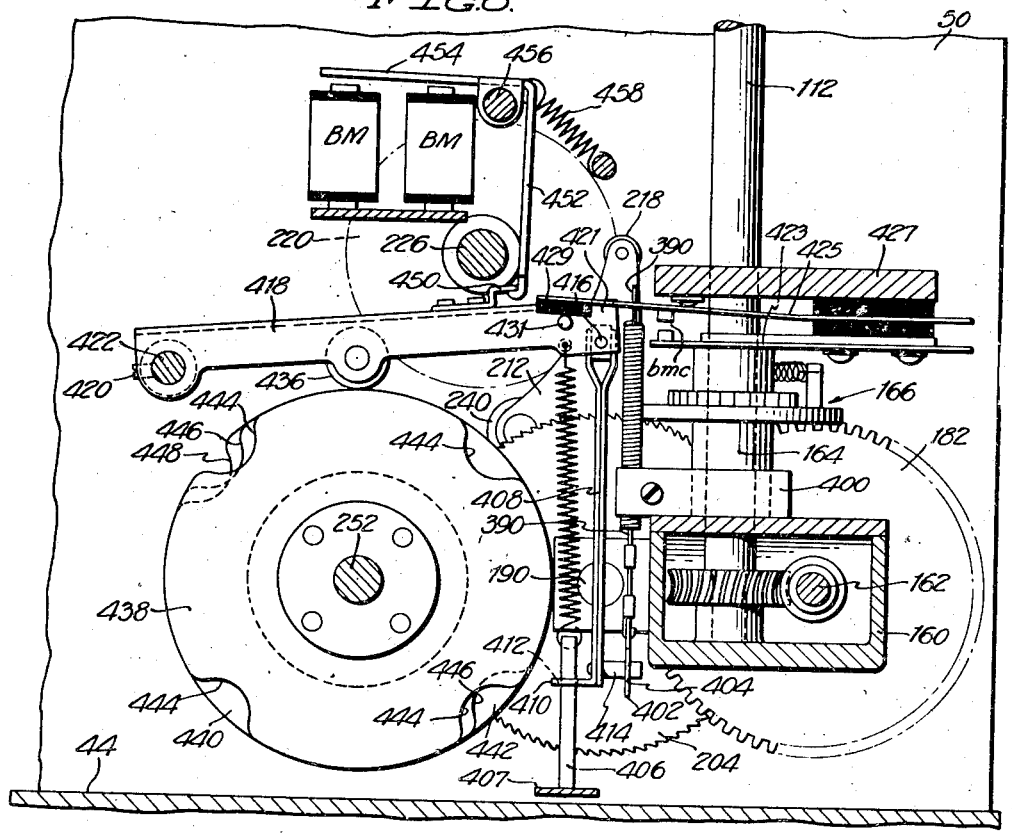
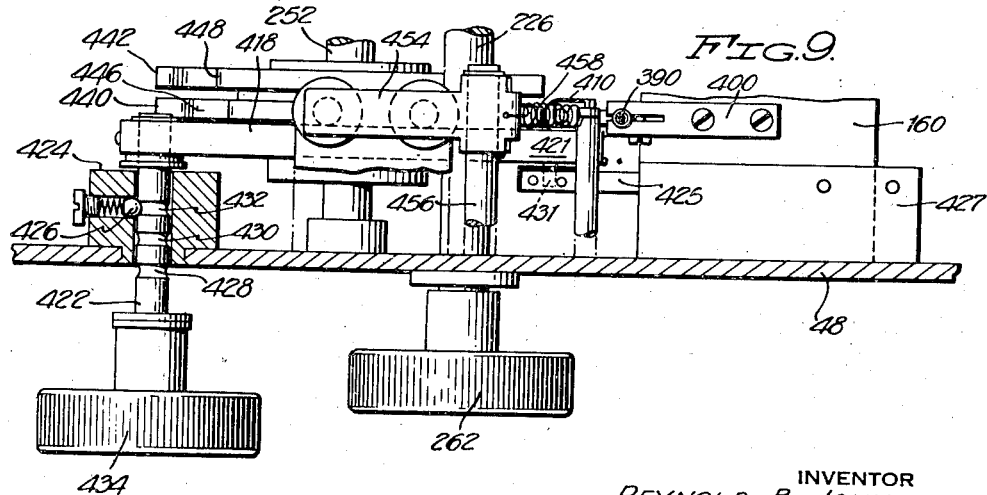

INVENTOR
REYNOLD B. JOHNSON
BY
W. M. Wilson
ATTORNEY

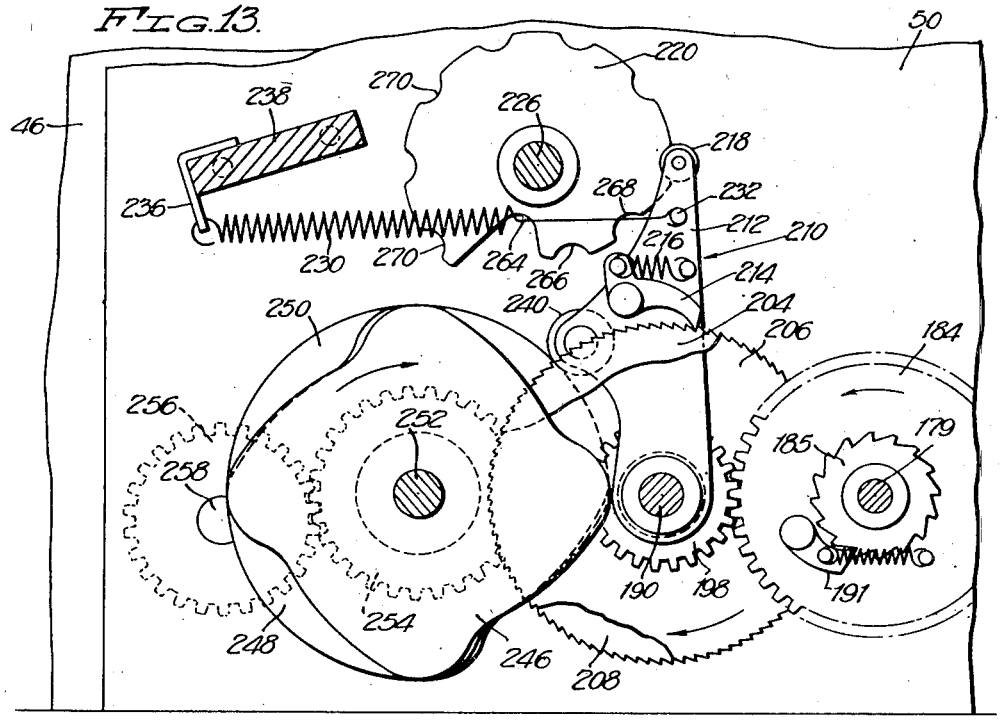
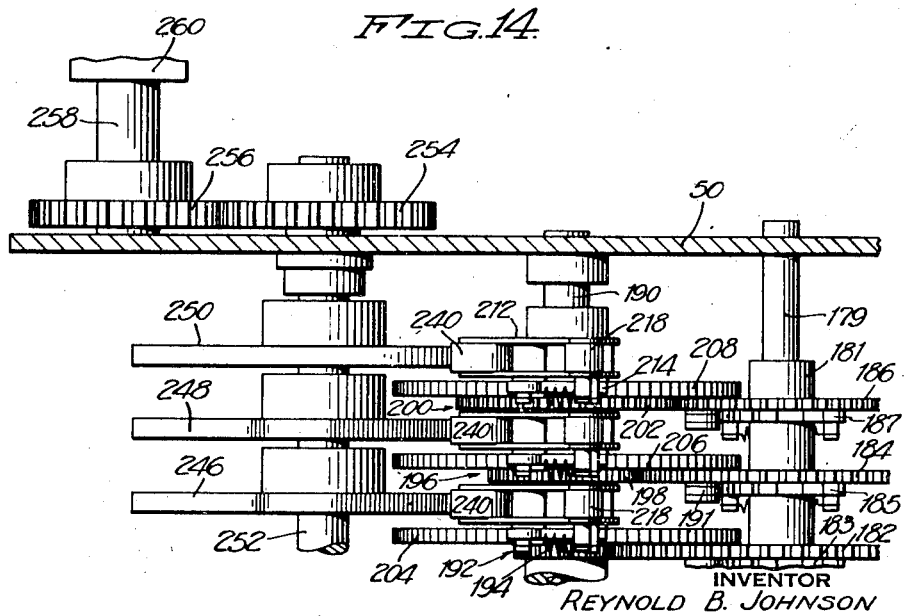

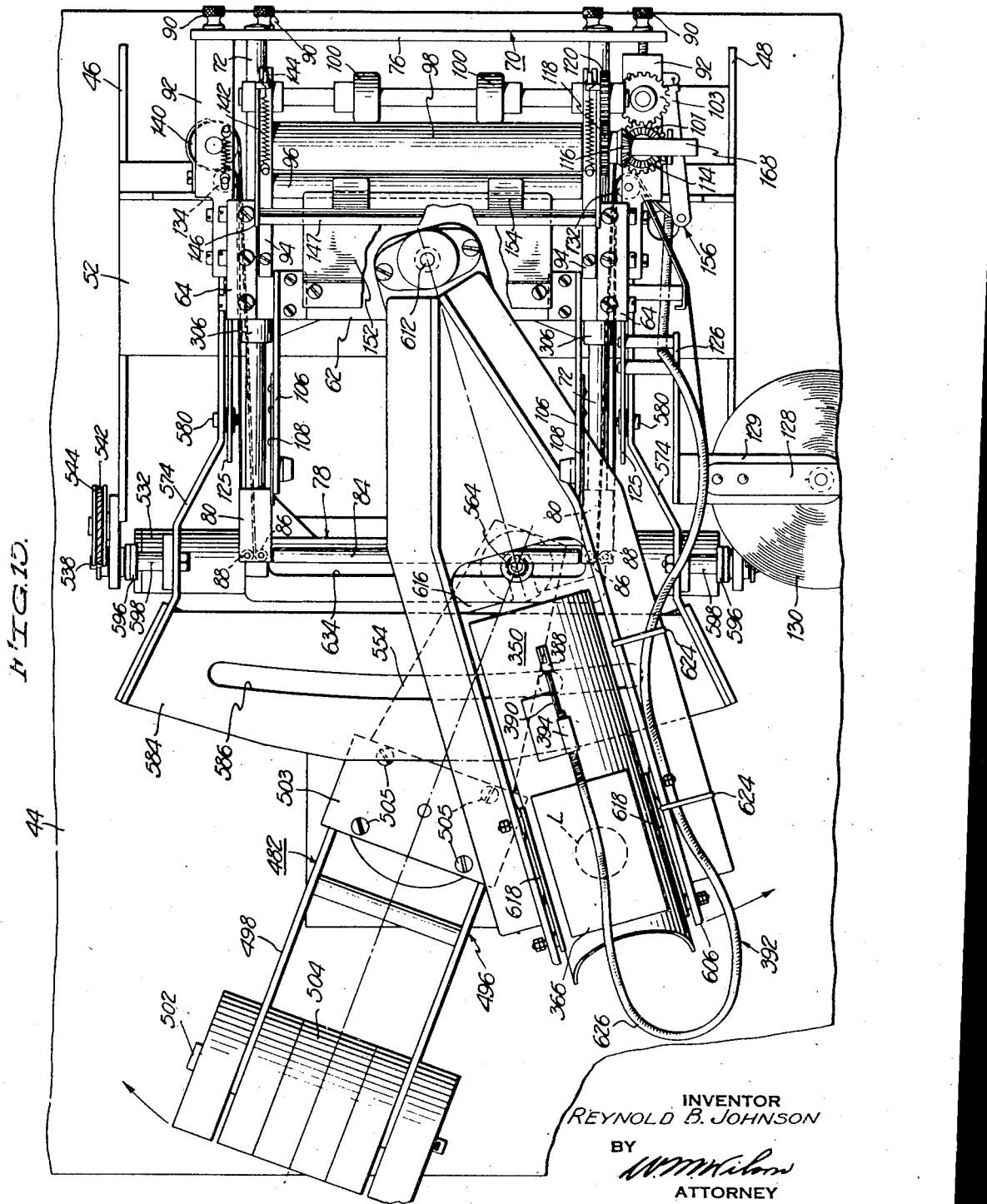

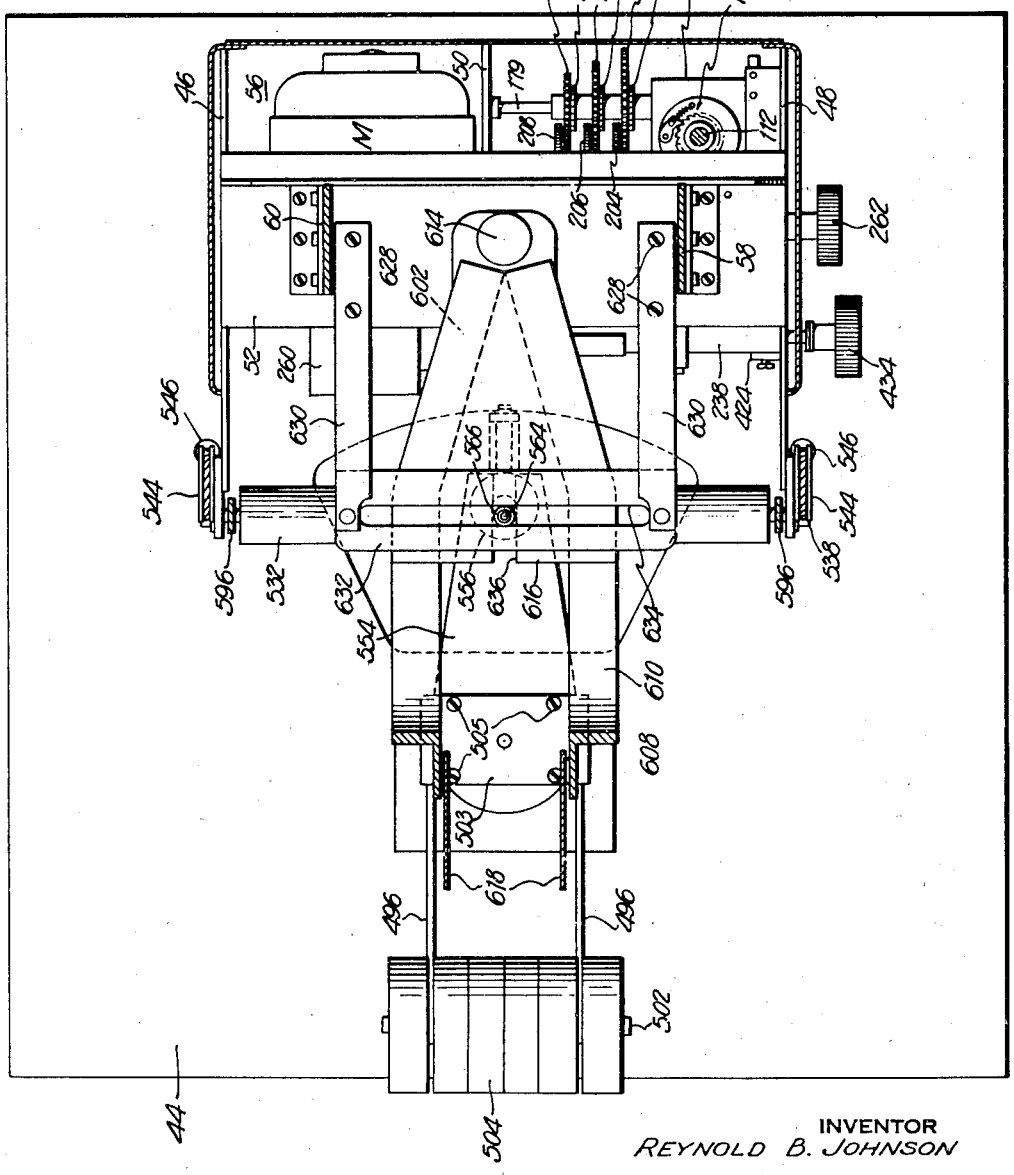

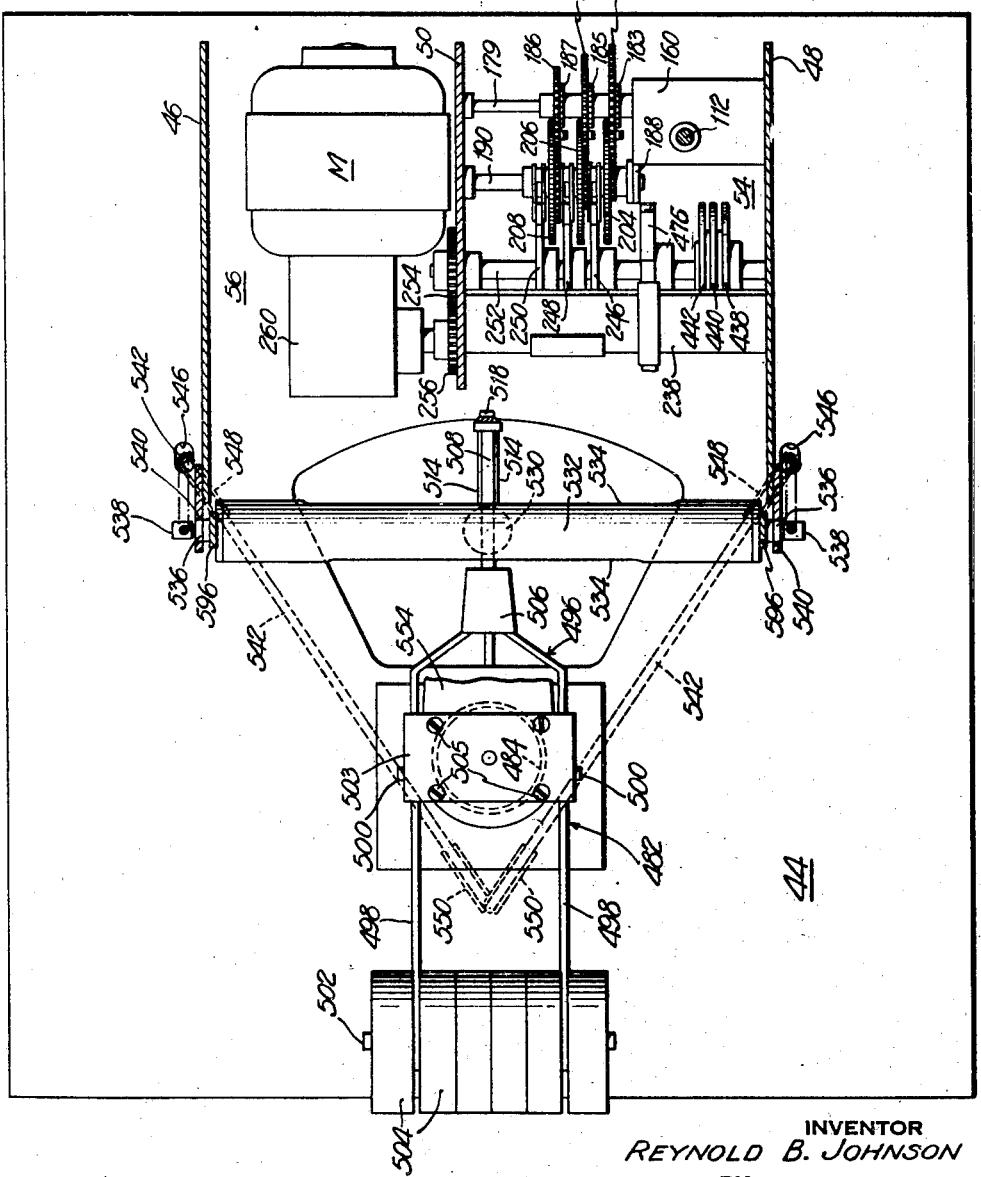

April 8, 1947.  R. B. JOHNSON  2,418,512
ARTILLERY TRAINING APPARATUS AND METHOD
Filed Sept. 8, 1944   20 Sheets-Sheet 14

INVENTOR
REYNOLD B. JOHNSON
BY
ATTORNEY

April 8, 1947. R. B. JOHNSON 2,418,512
ARTILLERY TRAINING APPARATUS AND METHOD
Filed Sept. 8, 1944 20 Sheets-Sheet 16

INVENTOR
REYNOLD B. JOHNSON
BY
ATTORNEY

April 8, 1947.   R. B. JOHNSON   2,418,512
ARTILLERY TRAINING APPARATUS AND METHOD
Filed Sept. 8, 1944   20 Sheets-Sheet 17

INVENTOR
REYNOLD B. JOHNSON
BY
ATTORNEY

April 8, 1947.  R. B. JOHNSON  2,418,512
ARTILLERY TRAINING APPARATUS AND METHOD
Filed Sept. 8, 1944 20 Sheets-Sheet 18

INVENTOR
REYNOLD B. JOHNSON
BY
ATTORNEY

April 8, 1947. R. B. JOHNSON 2,418,512
ARTILLERY TRAINING APPARATUS AND METHOD
Filed Sept. 8, 1944 20 Sheets-Sheet 19
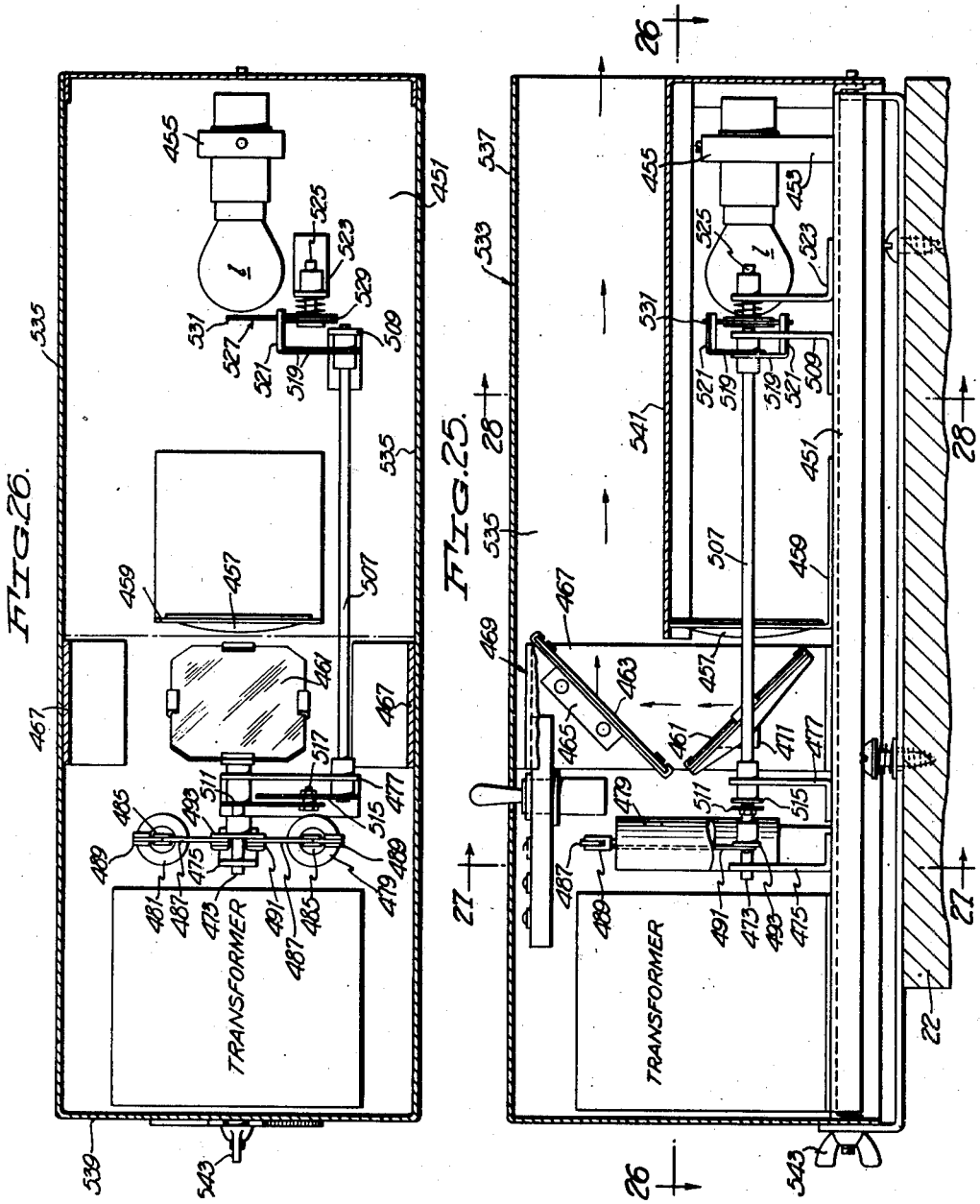
INVENTOR
REYNOLD B. JOHNSON
BY
ATTORNEY

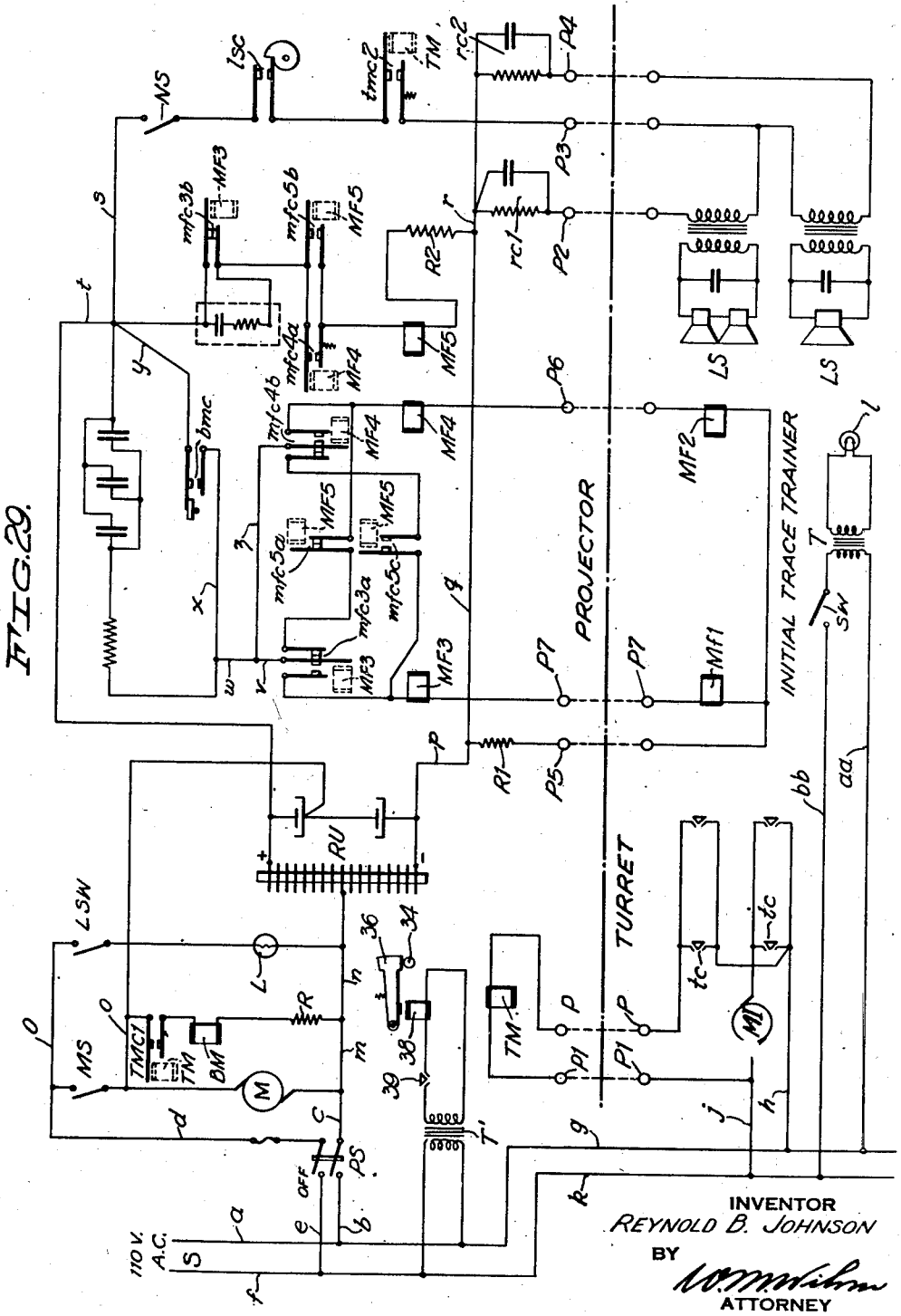

Patented Apr. 8, 1947

2,418,512

UNITED STATES PATENT OFFICE 2,418,512

ARTILLERY TRAINING APPARATUS AND METHOD

Reynold B. Johnson, Binghamton, N. Y., assignor to International Business Machines Corporation, New York, N. Y., a corporation of New York Application September 8, 1944, Serial No. 553,167

12 Claims. (Cl. 35—25)

The improved artillery training apparatus comprising the present invention is primarily adapted for use in the training of student gunners in the art of tracer firing under conditions closely simulating actual combat. The apparatus may be designed for a great variety of conditions, as for example, conditions as they actually exist in the cockpit or turret compartment of a moving combat plane, on board a ship equipped with anti-aircraft or other tracer firing artillery, or at a land based installation.

For purposes of illustration, the invention has been designed for use under conditions simulating the firing of tracer bullets from a conventional dual-gun turret installation in a moving combat plane and which is capable of firing 1,200 rounds of ammunition per minute, either on a basis of 12½% tracer firing wherein every eighth projectile is a tracer bullet, 25% tracer firing wherein every fourth projectile is a tracer bullet, or 50% tracer firing wherein every other bullet is designed for tracer purposes.

The use of tracer projectiles in firing upon moving targets, such as airplanes, affords the gunner a reliable guide for aiming and firing, inasmuch as invariably he is required to "lead" the moving target at a predetermined angle, depending upon the speed of the target, its range, the time of flight of the projectile and the direction of flight of the target with respect to the line of fire. The optical phenomena presented to the gunner upon discharge of each luminous tracer bullet facilitates his consideration of all of the above factors and each tracer projectile becomes a guide for the aiming of the gun and the firing of the next succeeding projectile in such a manner that the moving target will approach and become superimposed upon the stationary diminishing light spot representing the projectile at the moment when the "close-off" for that projectile occurs. It is not sufficient that the target traverse the gradually diminishing spot of light representing the tracer bullet for if the close-off occurs after the target has traversed the same the gunner will know that either he has failed to lead his target by a sufficient angle or he has failed to withhold his fire until the target has come within range. Similarly, if the target traverses the point at which the close-off occurs after it has occurred, the gunner will know that he has led the target by too great an angle. It is necessary that the close-off occur on the moving target and when such is the case the target has been effectively hit. Since by means of the present invention actual conditions of combat are simulated, the principal object of the invention is to provide an apparatus by means of which a student gunner may be given effective training in the art of leading his target.

Heretofore, extremely few student gunners have been given the opportunity to fire more than a few rounds of ammunition in actual practice under conditions simulating those of actual combat. This is due entirely to the extremely high cost involved in furnishing such training, both from the point of view of the cost of the ammunition required and the cost of the equipment. The present invention is designed to overcome the above noted cost limitations that are attendant upon the training and preparation of aerial and other gunners for combat duty and, toward this end, contemplates the provision of a method and apparatus whereby an aerial gunner may receive instruction in aerial warfare including the aiming and firing of artificial weapons at moving targets under conditions which very closely simulate actual combat and at a very small fraction of the cost that would be involved.

In carrying out the principles of the present invention, briefly, a moving target which is entirely illusory and consists of a moving picture projection of an actual piloted plane is thrown upon a moving picture screen. In this manner, by the use of expert pilots in producing the motion picture film, difficult combat maneuvers may be executed for repeated target use with the illusory target moving relative to the attacking plane. For experience in the aiming and firing of weapons at the thus created artificial moving target, the student gunner is furnished with a maneuverable dummy weapon which is constructed to simulate the actual weapon with which he is to be trained. In the present instance, a maneuverable dual-gun turret installation involving all of the usual turret accoutrements, including the gunner's compartment, his seat, his instruments and the weapon itself is mounted and installed in front of the target screen and is representative in every respect of actual combat conditions.

An apparatus, hereinafter referred to as the trace projector proper, is positioned in a suitable location relative to the target screen. This apparatus includes certain projection mechanism for creating and projecting tracer effects upon the screen by means of a concentrated and properly controlled beam of light. In the production of the tracer effects by this projection apparatus, stationary and preferably circular illuminated spots are caused to be projected upon the target screen at exact positions determined by the aiming and firing of the dummy training weapon in the hands of the student gunner. These spots are of predetermined size and immediately upon their projection on the screen they are caused to gradually and uniformly diminish in size to points of nothingness and at a predetermined rate of diminution so that a condition of close-off occurs after a predetermined length of time. The tracer spots deviate neither to the left nor to the right and neither upwardly nor downwardly since the ballistic drop of an actual projectile is negligible within firing range. The spot is possessed only of dimensional deviation as it decreases in size and ultimately vanishes at the point of close-off. Such spots of light are projected upon the target screen at the will of the student gunner as he manipulates the turret controls and they give the effect or illusion of tracer firing at the moving target under conditions closely simulating actual combat.

For the projection and control of such tracer spots on the target screen, a system of placement punching of very small holes through opaque paper tracer blank media and the immediate projection through the punched holes of a concentrated beam of light is employed. An area of the tracer blank media is correlated with the effective area of the target screen and thus, by proper placement of holes in the tracer blank media within the limits of the correlated area, corresponding placement of tracer spots is effected on the target screen.

Gradual diminution and close-off of the projected tracer spots on the target screen are effected by utilizing composite multi-layer tracer blank media whose effective correlated area, as described above, consists of multiple layers of thin opaque sheet material. Each layer or lamination of the tracer blank media is capable of moving in a vertical plane and in a direction different from the directions of movement of the other layers which comprise its various counterparts. While any number of individually moving laminations may cooperate to make up the effective correlated area of the tracer blank media, and while in general the greater the number of moving laminations employed the more effective the illusory diminution effect upon the projection screen, four such moving layers are deemed adequate to offer results that are consistent with practical engineering exigencies, while at the same time attaining satisfactory and uniform diminution of the tracer spots within the predetermined close-off period.

Where four such laminations are employed in the effective correlated area of the composite tracer blank media, two of them are caused to move progressively and oppositely in a horizontal direction, while the other two are caused to move progressively and oppositely in a vertical direction. The various layers are moved or indexed in their respective directions in step-by-step fashion in such a manner that at any increment of time all of the layers are either motionless or all of them are in motion simultaneously. The period of time during which the sheets are maintained motionless is utilized for operation of the tracer spot punch or needle in order that clearly defined apertures, all of which are initially in complete register, may be effective without rupturing the paper material of the various layers.

To effect proper punching and placement of holes in the correlated area of the tracer blank media, and for the concentration upon the perforations of a beam of light, a moving light tube is employed and includes an internal light source, an optical system including a concentrating lens, and a punch or needle, the operation of which is trigger-controlled by the operator of the dummy weapon. The light tube is movably mounted behind, and in close proximity to, the correlated area of the tracer blank media and one novel feature thereof is the fact that the needle itself passes axially through the concentrating lens and is normally maintained in a retracted position within the lens and is adapted to be projected at will by means of the trigger control so as to perforate or puncture the tracer blank media, each perforation corresponding to the discharge of a luminous tracer projectile. The movement of the light tube, and the consequent orientation of the perforating needle relative to the tracer blank media, is correlated with the orientation of the dummy weapon relative to the target screen. To effect correlation of movement between the dummy weapon and the light tube, mechanical connections are extended between these two instrumentalities and are in the form of cables and other control devices. The light tube is supported in, and its movements are jointly controlled by, a horizontal train cradle from which it derives its lateral angular components of movement, and an elevational train cradle from which it derives its vertical angular components of motion. These components of motion are complex in their nature and consist of both shifting movements bodily and angularly. Provision is made for maintaining the center of the concentrating lens, through which the needle extends and from which it is periodically projected, in a single vertical plane, all points of which are maintained equidistant from the plane of the tracer blank media. In this manner, the effects of spherical aberration during aiming of the dummy weapon, and existing by virtue of the angular displacement of the dummy weapon relative to the plane of the target screen at the relatively short distance existing between the two, is compensated for when the tracer effects are cast upon the screen.

The combined movements of the elevational train cradle are controlled by means of an instrumentality hereinafter referred to as a "sub gun." This sub gun is mechanically linked to the dummy weapon and it follows the movements of the former exactly, both as regards its elevational and its horizontal training components of motion. The two supporting train cradles for the light tube are both pivoted well forwardly of the tube itself and in this manner the movements of the tube include a bodily shifting of the latter, as well as an angular shifting relative to the plane of the tracer blank media. The various movements of the tube relative to the correlated area of the tracer blank media are in general the reverse of the aiming movements of the dummy weapon and a corrective optical system is employed forwardly of the tracer blank media for proper placement of the tracer spots upon the screen. For example, when the dummy weapon is aimed at a target proceeding across the screen and existing thereon near the upper left-hand corner of the latter, perforation of the correlated area of the tracer blank media will take place in a corresponding position near the lower right-hand corner of the tracer blank media. However, by virtue of the corrective optical system employed, the tracer spot will appear on the target screen in the vicinity of the point of aim.

The apparatus is adapted to accommodate tracer effects under various conditions of tracer firing, as for example, conditions of 12½%, 25% or 50% tracer fire. For such tracer effects, means are provided whereby the time of close-off of the projected light spot, and its consequent duration on the screen, may be varied. This is accomplished by the simple expedient of varying the rate of movement of the layers of laminations of the composite tracer blank media. It will be obvious that for 12½% tracer firing when a point of close-off occurs two-thirds of a second after the creation of the initial aperture through the composite tracer blank media on a basis of 1,200 rounds of ammunition per minute, tracer spots will be projected upon the screen every two-fifths of a second and the paper layers of the tracer blank media will be periodically indexed for complete close-off of the apertures two-thirds of a second after their initial creation. Under conditions of rapid fire, where the trigger of the dummy weapon is maintained depressed continuously, each spot will attain its close-off during the appearance of the next succeeding spot on the screen. Under conditions of 25% tracer firing, the paper layers of the tracer blank media will be moved at a slower rate of movement for closing-off of the apertures after one and one-third seconds have elapsed. Since one bullet in every four is a tracer bullet under these conditions, as many as seven tracer spots may appear on the screen at one time. Where tracer firing is on a 50% basis, the paper will be moving considerably slower, and by similar computations as many as twenty tracer spots may be visible on the screen at one time.

In addition to the effect a tracer projectile presents to the eye of the gunner, as described above, the gunner is confronted with additional phenomena in the form of muzzle flash which appears as a corona of light surrounding the muzzle end of the gun barrel or barrels. Such an effect exists by virtue of the combustion of projectile-impelling gases but it is not so brilliant as to obscure the tracer projectile. The present invention contemplates the provision of an auxiliary unit which provides a flash of light as each tracer shot is fired. When looking through the gun sight in the case of a dual-gun installation, the flash appears to leave the gun muzzle and converge upon the screen at the point of aim just as the tracer spot appears. This unit is mounted upon the turret gun cradle or gun mount at one side of the gun sight and is bodily movable with the cradle. The unit constitutes the subject matter of my co-pending application, Serial No. 553,168, filed September 8, 1944, for a Projection apparatus.

The present invention further contemplates substantial duplication of the sound effects encountered by a gunner under actual conditions of combat and, toward this end, certain electrical apparatus including a plurality of loud speakers, together with electrical circuits therefor, are provided whereby sound effects are correlated with the firing of the dummy weapon installation.

To summarize the above, the training apparatus is operated by manipulating the hand controls of a standard turret installation to enable the student gunner to aim his sight at any desired point on the screen. Squeezing of the trigger produces both the optical and sound effects of firing the guns. In accordance with the selected percent of "trace," a round of tracer ammunition is fired for a given number of shots. A round of tracer ammunition is indicated by the punching of a small hole in a miniature screen comprised of four layers of thin opaque paper. A projection lamp is positioned behind the miniature screen and a projection lens is mounted in front of the miniature screen. The small hole produced in the miniature screen permits the passage of light, which in turn is projected as a bright spot on a large target screen. The spot on the target screen coincides with the point of aim of the turret weapon and appears for every round of tracer ammunition. This spot remains illuminated for a length of time commensurate with the length of time the tracer compound burns in real ammunition. After the projection of the spot on the screen, it immediately becomes smaller to simulate the appearance of tracer bullets traveling into space. This reduction in the size of the tracer spot and its final extinction on the screen is accomplished by moving the four thin sheets of paper that comprise the miniature screen with respect to one another in different directions until the holes are no longer in register. A sub gun which derives its movements from the turret weapon is connected to a horizontal train cradle and an elevational train cradle which cooperates in moving the projection lamp assembly for proper placement of the holes in the miniature screen.

An auxiliary projection device provides a flash of light as each tracer shot is fired in such a manner as to simulate muzzle flash.

The provision of a training apparatus of the character briefly outlined above being the principal object of the invention, numerous other objects and advantages will become apparent as the nature of the invention is better understood.

In the accompanying 20 sheets of drawings forming a part of this specification, one embodiment of the invention has been disclosed.

In these drawings:

Fig. 1 is a perspective view, somewhat schematic in its representation, showing a complete trace trainer installation constructed in accordance with the principles of the prevent invention and set up for actual operation thereof.

Fig. 2 is a side elevational view, also schematic in its representation, and showing the dummy weapon or free gun assembly and trace trainer assembly, together with their associated mechanical connections.

Fig. 3 is a perspective view of the trace projector assembly with certain parts removed to more clearly illustrate the principles of the invention.

Fig. 4 is an enlarged side elevational view of the trace projector assembly, certain parts being eliminated and others broken away to more clearly illustrate the principles of the invention.

Fig. 5 is an enlarged, fragmentary view, similar to Fig. 4, certain other parts being removed and still others shown in section to more clearly reveal the nature of the invention.

Fig. 6 is a front elevational view of the trace projector proper with the paper frame front plate removed for the purpose of clarity.

Fig. 7 is a sectional view taken substantially along the line 7—7 of Fig. 6.

Fig. 8 is a sectional view taken substantially along the line 8—8 of Fig. 6.

Fig. 9 is a top plan view of the structure shown in Fig. 8.

Fig. 10 is an enlarged detail view, partly in section, of certain instrumentalities which appear at the upper right-hand corner of Fig. 5.

Fig. 13 is a sectional view taken substantially along the line 13—13 of Fig. 6.

Fig. 14 is a top plan view of the structure shown in Fig. 13.

Fig. 15 is a top plan view of the trace projector assembly.

Fig. 16 is a sectional view taken substantially along the line 16—16 of Fig. 6.

Fig. 17 is a sectional view taken substantially along the line 17—17 of Fig. 6.

Fig. 25 is a side elevational view of the unit shown in Fig. 24 with one side wall of the casing removed and certain other parts being broken away for the purpose of clarity.

Fig. 26 is a sectional view taken substantially along the line 26—26 of Fig. 25.

Fig. 29 is a diagrammatic view showing the electrical connections for the trace trainer apparatus.

In all of the above described views like characters of reference are used to designate like parts throughout.

Figure 5A:
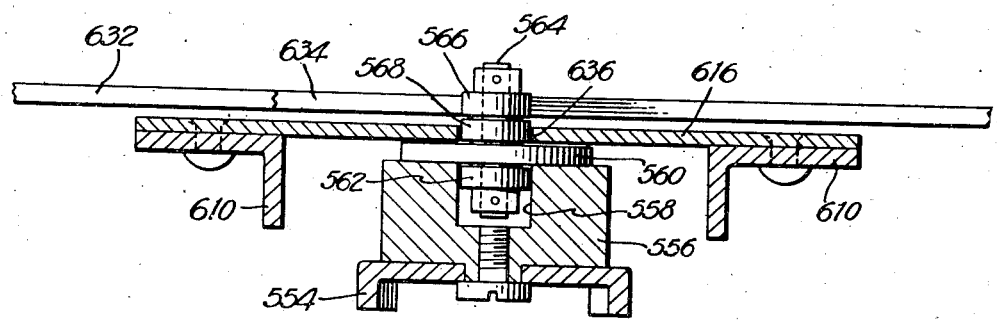
Fig. 5a is an enlarged detail sectional view taken substantially along the line 5a—5a of Fig. 5.

Referring now to the drawings in detail, and particularly to Figs. 1, 2 and 3, the trace trainer apparatus involves in its general organization a dummy weapon or free gun assembly 10, a trace projector assembly 12, a dual motion picture projector assembly 14 and a motion picture screen 16.

Except for certain mechanical connections, by means of which motion of the dummy weapon 10 is transmitted to the trace projector assembly 12, this former assembly is more or less conventional in its design and no claim is made herein to any novelty associated with the same.

The dummy weapon 10 is in the form of a rotary turret 19 having a pair of dummy or free guns 18 and a gun sight 20 associated therewith. The gun sight 20 and the guns 18 are mounted upon a tiltable gun mount or cradle 22 for training motion in unison on moving targets projected on the screen 16 by means of the dual motion picture projector assembly 14. The turret 19 is further provided with a seating compartment 21 for an operator, together with suitable hydraulic power mechanism and driving controls therefor (not shown) by means of which the lateral turning movements of the turret, and consequently of the guns 18, as well as the elevational movements of the cradle 22, may be controlled at the will of the operator seated in the compartment 21.

The turret 19 may, if desired, consist of a specially constructed training unit designed to simulate an actual weapon and having the usual turret accoutrements associated therewith, by means of which the operator seated within the compartment 21 may go through the usual maneuvers and experience in a large measure sensations which are similar to those encountered in actual combat.

The free gun assembly 10 also includes a dual trigger control mechanism 26 (Fig. 1) of conventional design for actuating a pair of trigger contacts tc, one for each gun (Fig. 29), by means of which an electrical circuit may repeatedly be established to actuate the trace projector assembly 12 and cause the latter to produce certain optical effects on the screen 16 in a manner that will become apparent presently.

The trace projector assembly 12 is located directly behind the turret installation 10 and includes a trace projector proper 24 by means of which tracer effects are projected upon the screen 16. These tracer effects, as previously described, consist in the repeated projection of circular illuminated spots or areas of light upon the target screen at exact positions which are determined by the aiming of the guns 18 and in timed relation to the "firing" of the latter.

The motion picture projector assembly 14 is also of conventional design and includes a pair of synchronously driven projectors 28 and 30 (Fig. 1). The projector 28 is adapted to receive and operate upon a motion picture film f, by means of which simulations 29 of an actual target or targets, which may be a moving attacking plane or a plurality thereof, are thrown on the screen and caused to move thereon. The projector 30 is adapted to receive and operate upon a motion picture film f₁ by means of which an image or "lead target" 31 is projected upon the screen at a suitable point in the apparent path of movement of the target simulation 29 in advance of the latter. The film f₁ is of the so-called "animated" type and is produced by the artist according to certain well-known calculations in such a manner that the lead target, which corresponds in detail to the optical effect of the gun sight 20 upon the vision of the operator, will follow the movements of the actual target 29 and at all times appear on the screen at a position sufficiently in advance of the actual target that a spot of light thrown upon the screen at the point where the lead target exists will correspond to a "hit" on the actual target 29. Because of the fact that the spots or areas of light projected upon the screen when the operator manipulates the trigger contacts tc are caused to gradually diminish in area from the moment they strike the screen, any "hit" registered upon the lead target will eventually fade out during the period of time when it is traversed by the actual target.

The projectors 28 and 30 are provided with the usual projector tubes 32 and 34 respectively. A swinging shutter element 36 is disposed in front of the projector 30 and is provided with an actuating magnet 38 operable upon energization thereof to move the shutter into a position directly in the path of light issuing from the tube 34, thus blocking the lead target 31 from the screen 16. A push button 39 is provided on the side of the dual projector casing and is operable upon depression thereof to energize the magnet 38. In this manner, the instructor may, at will, cause the lead target 31 to disappear from the screen 16 in order that the turret operator may continue to practice the art of leading the target without the benefit or assistance of the lead image.

The gun mount or cradle 22, in addition to carrying the guns 18 and gun sight 20 thereon, also has mounted thereon a flash projector unit 35 (Figs. 1, 2 and 24 to 28 inclusive), the function of which is to create additional illusory effects upon the screen in such a manner as to give the illusion of actual muzzle flash as encountered in actual combat firing. The nature of the unit 35 and its operation will be set forth subsequently.

Referring now to Figs. 1 to 4 inclusive, the trace trainer apparatus per se is mounted upon a cabinet or stand 40 which is generally of rectilinear configuration and which includes vertical side walls 42 and a flat table top or portion 44 upon which the trace projector proper is mounted.

The trace projector proper involves in its general organization a lower stationary framework including vertical side plates 46 and 48, a center wall or partition plate 50 and an open bottom. A top plate or shelf 52 extends over and is supported upon the plates 46, 48 and 50 and thus the lower portion of the projector is divided into two compartments 54 and 56, the former of which constitutes a cam and gear compartment and the latter of which constitutes a motor compartment for enclosing an electric motor M, mounted on a support S and by means of which most of the operative moving parts of the machine are actuated.

A pair of stationary upper side plates or standards 58 and 60 project upwardly from the top plate or shelf 52 and a horizontal cross piece 62 secured in position by means of angle pieces 64 (Fig. 5) extends across the top of the unit bridging the distance between the standards 58 and 60. A pair of rearwardly extending longitudinal bars 66 (Fig. 4) are secured to the standards 58 and 60 and a similar pair of forwardly extending longitudinal bars 68 are similarly secured to these standards. A removable paper frame unit designated in its entirety at 70 is adapted to be received between the two standards 58 and 60 and is slidably supported upon the bars 66 at each side of the apparatus.

The paper frame unit 70 is in the form of a framework which is generally of rectilinear configuration and includes upper and lower longitudinally extending rods 72 and 74 respectively, a front rectangular frame piece 76 and a unitary one-piece rear rectangular frame piece 78 having corner pieces 80 into which the rods 72 and 74 extend and are anchored. Extending between each pair of corner pieces 80 are a pair of paper idler rollers including inner, upper and lower horizontal rollers 82 (Fig. 18), outer, upper and lower horizontal rollers 84, inner vertical rollers 86 (Fig. 19) and outer vertical rollers 88. The paper frame is adapted to be securely held in position within the unit by means of four thumb screws 90 (Fig. 4) which pass through the front frame piece 76 and two of which are threadedly received in the ends of the longitudinal bars 68, the other two being threadedly received in the ends of a pair of upper longitudinal bars 92 which are secured to the standards 58 and 60 and project forwardly therefrom.

A pair of forwardly extending bars 94 (see also Fig. 5) are secured to the cross piece 62 and serve to rotatably support therebetween a horizontal idler roller 96 and a pair of power-driven paper feed rollers 98 and 100. An inner idler roller 102 and an outer power-driven paper feed friction roller 104 are rotatably supported between the two longitudinal bars 68. A pair of inclined brackets 106 serve by means of spring fingers 108 to releasably retain therebetween a roll 110 of thin opaque paper which is preferably carbon paper stock prior to the application of carbon compound thereto. The paper material p issuing from the roll 110 is threaded in the manner shown in Fig. 18 over and around the idler roller 96 and over and around the outer, upper and lower horizontal rollers 84 and over the idler roller 102. From thence the paper is led around the drive roller 104, between the two lower rollers 82 and 84, between the two upper rollers 82 and 84 and finally between the two driving rollers 98 and 100.

The driving connections for driving the paper issuing from the roll 110 include a system of gearing, all of which is driven in step-by-step fashion in small increments of motion from a main vertically extending feed shaft 112 (Figs. 4, 5, 6 and 7) having a bevel gear 114 mounted on its upper end. The bevel gear 114 meshes with a similar gear 116 carried by the roller 98 and an additional gear 118 on the roller 98 meshes with a gear 120 on the roller 100. Thus it will be seen that as paper is fed from the roll 110 around the various feed and idler rollers just described, it will be positively driven both by the pair of feed rolls 98, 100 and by the feed roller 104.

Referring now to Figs. 3 and 16, a pair of side plates 125 and 127 are secured to the standards 58 and 60 respectively and project rearwardly of the machine. A bracket 126 is secured to the upper and lower regions of the side plate 58 and has laterally projecting arms 129 formed thereon. These latter arms, by means of spring fingers 128, serve to support therebetween a second roll of paper 130.

An idler roller 132 (Figs. 5 and 19) extends between the upper longitudinally extending bar 92 and a similar lower longitudinally extending bar 93 which is secured to the standard 58. A similar idler roller 134 (Fig. 19) is suitably mounted on the side of the machine opposite the roller 132. A power-driven roller 140 (Figs. 6 and 19) having a function similar to the function of the roller 104, extends in a vertical direction adjacent the idler roller 134. A pair of power-driven rolls 136 and 138 extend in a vertical direction and are located adjacent the idler roller 132, these latter rolls being rotatably journaled in the upper longitudinal bar 92 and lower longitudinal bar 93.

Figure 19:
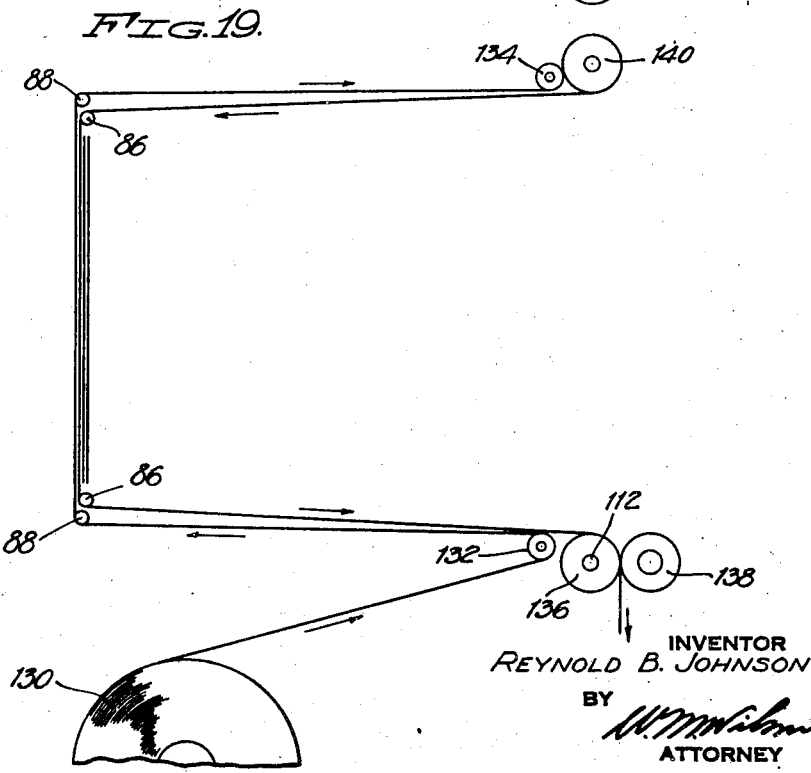
Fig. 19 is a schematic view, similar to Fig. 18, showing the manner in which the vertically disposed and vertically moving paper layers are threaded through the machine.

Referring now to Fig. 19, paper issuing from the roll 130 is threaded around the idler roller 132, around the two outer vertically extending rollers 88, inside of the roller 134 and around the driving roller 140. From thence the paper is led between the inner and outer vertical rollers 86 and 88, both at the top and at the bottom of the machine, and from thence outwardly through the two driving rolls 136 and 138.

The driving connections for driving the paper issuing from the roll 130 are similar to those just described in connection with the roll 110. These connections include a system of gearing which also is driven in step-by-step fashion in small increments of motion from the vertically extending feed shaft 112. Toward this end, the roller 136 (Figs. 5 and 6) which is directly coupled to the shaft 112 is provided with a gear 101 at its upper end and which meshes with a similar gear 103 associated with the roller 138. The roller 104 carries at one end thereof a bevel gear 131 which meshes with a similar gear 133 carried by the roller 140 and in this manner positive motion of this latter roller is obtained from the vertical shaft 112.

Figure 5B:
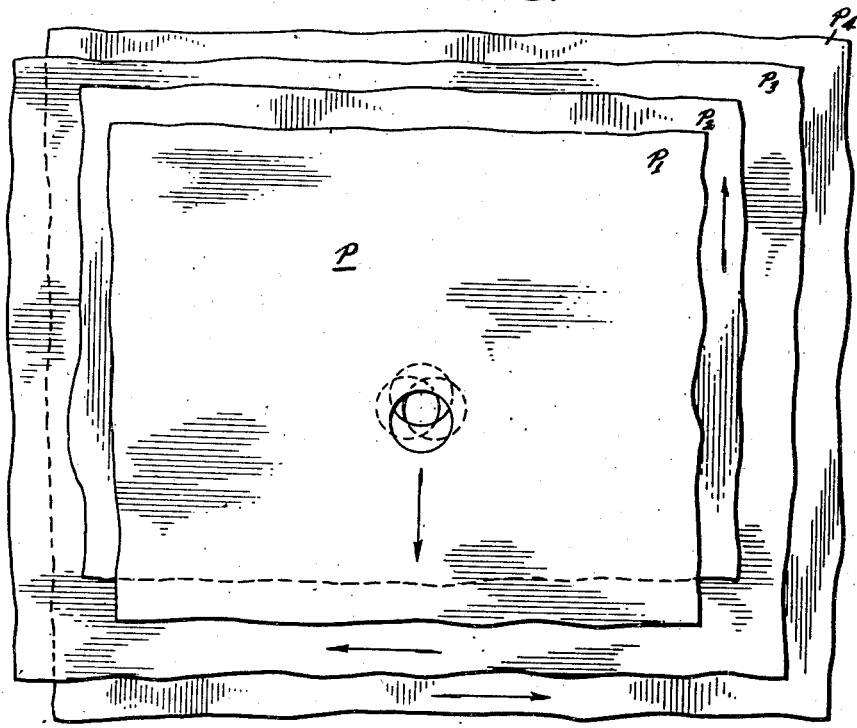
Fig. 5b is a schematic view illustrating the manner in which the individual layers of paper in the composite multilayer tracer blank media move.

It will be seen that at the rear of the paper frame 70 two adjacent vertically moving layers of paper are supported on different pairs of idler rollers 82 and 84 (Figs. 18 and 19) and are adapted to exist in contiguous relationship and move in opposite directions upon actuation of the driving rolls 98, 100 and 104, while at the same time two adjacent horizontally moving layers of paper are similarly supported from the inner and outer pairs of rollers 86, 88 and exist in contiguous relationship for movement in opposite directions upon actuation of the driving rollers 136, 138 and 140. All in all, therefore, at the rear of the paper frame there exist four vertically disposed moving layers of paper, two of which move vertically in opposite directions and two of which move horizontally in opposite directions. Reference to Fig. 5b will indicate the direction in which each layer of paper p moves. The four paper layers are designated at p1, p2, p3 and p4, reading from front to rear. The layer p1 moves downwardly, the layer p2 moves upwardly, the layer p3 moves to the left and the layer p4 moves to the right.

Figure 18:
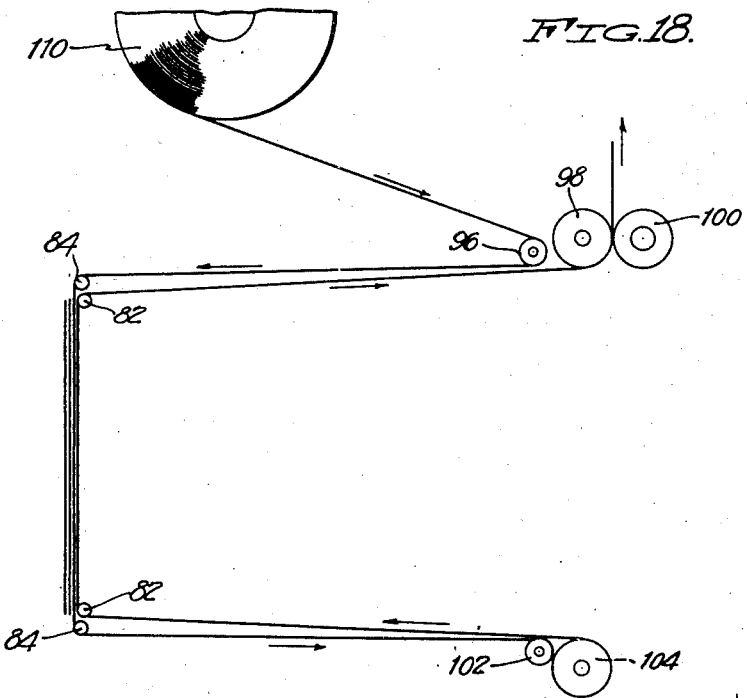
Fig. 18 is a schematic view illustrating the manner in which the vertically disposed, horizontally moving paper layers are threaded through the machine.

It is to be noted in connection with Figs. 18 and 19 that paper issuing from the roll 110 is positively engaged on opposite sides by the two power driven rolls 98 and 100, the action of these rolls being to pull the paper over the various idler rollers from the paper roll 110. The power-driven roller 104 serves in effect as a friction roller since the paper is passed therearound and this latter roller assists the positive action of the two rollers 98 and 100 in driving the paper.

In the case of the horizontally moving paper issuing from the roll 130, substantially the same type of paper drive as that just described obtains. The two power-driven rolls 136 and 138 engage the paper positively on opposite sides thereof and draw the same from the paper roll 130. The power-driven roller 140 on the side of the machine opposite the rolls 136, 138 serves as a friction roller to assist the other rolls in drawing the paper over the various idler rolls.

Referring now to Figs. 5, 10 and 15, the roller 100 is of the floating type, it being mounted in horizontal slots in the two bars 94 from which it is supported. Positive gripping action on the paper by the rollers 98 and 100 is obtained by means of a pair of springs 142 which are attached to pivoted levers 144, the tendency of which is to normally urge the roller 100 against the roller 98. A U-shaped bracket having side members 146 and a cross piece 147 is pivoted to the forwardly extending bars 94 and the side members 146 are adapted to exert a camming action on the levers 144 so that when the frame is moved from its full line position, as shown in Fig. 10, to the dotted line position thereof, the levers are moved rearwardly, thus relieving the pressure normally existing between the rolls 98 and 100. In order to maintain the paper release frame 146, 147 in its elevated position of release, the levers 144 are provided with notches 148 therein designed for registry with fingers 149 formed on the side members 146. The notches 148 are relatively shallow and the paper release frame may be moved to either of its two positions merely by manual application of pressure thereto in either direction. A pair of studs 150 project upwardly from the upper surface of the cross piece 62 and serve to support therebetween a flexible resilient inclined guide plate 152. The cross member 147 of the paper release frame also carries a flexible resilient guide plate 154 which cooperates with the plate 152 in guiding the paper around the idler roller 86. Obviously, when the paper frame is in its elevated dotted line position, the two guide plates 152, 154 become separated.

The two power driven rolls 136 and 138 are provided with a paper guide and release assembly designated in its entirety at 156 (Figs. 15 and 16). This latter assembly is substantially identical in its design to the paper guide and release assembly just described and it is thought that the description previously given in connection with the former will suffice for the latter.

As has previously been stated, means are provided for periodically indexing the shaft 112 in order that the four layers of paper existing at the rear of the paper frame unit 70 may be moved in their respective directions so that when the layers of paper are pierced, the aperture which passes completely through these paper layers will gradually diminish in size to produce the desired optical effects on the screen.

Referring now to Figs. 5, 6, 7 and 8, the side plate 48 has mounted thereon a gear reduction unit 160 which includes a drive shaft 162 and a driven shaft 164. The driven shaft 164 is coupled to the vertical driving shaft 112 by means of a ratchet assembly designated in its entirety at 166 (Figs. 6 and 7) and including a ratchet wheel 163 and a pawl 165 which is spring pressed as at 167. The power driven roller 98 is provided with an extension 168 at one side of the machine in the form of a shaft which is adapted to receive thereover an operating handle 170, shown in dotted lines in Fig. 6, in order that the paper may be advanced manually whenever desired. Since the shaft 168, roller 98 and gear 120 comprise a single unitary structure, it will be seen that rotation of this unit by the handle 170 in the direction of paper feed will, by virtue of the system of gearing previously described, including the gear 120, serve to advance both the horizontally moving and vertically moving paper layers. The ratchet mechanism 166 serves as a lost motion device whereby the paper driving mechanism may be manually operated without transmitting motion back through the gear reduction device 160 to the motor M.

Disposed within the compartment 54 is a cam and gear assembly designated in its entirety at 180 by means of which both the period and extent of the indexing operations applied to the shaft 112 may be varied to accommodate different conditions of tracer firing. The period, i. e. the frequency with which the shaft 112 is indexed, is adapted to be varied to accommodate conditions of 12½%, 25% or 50% tracer firing, as previously described. The extent to which the shaft 112 is indexed at each periodic indexing thereof is adapted to be varied in order to accommodate the different ranges of tracer firing, as for example, at a range of 600 yards, 1,200 yards or 1,800 yards, as previously described.

The drive shaft 162 of the gear reduction device 160 projects laterally through one end of the gear box casing as at 179 (Figs. 6, 14 and 17) and has affixed thereto and mounted thereon a sleeve 181 on which there is mounted for rotation in unison therewith a plurality of ratchet drive wheels 183, 185 and 187. A plurality of gears 182, 184 and 186 are loosely mounted on the sleeve 181 adjacent the ratchet wheels 183, 185 and 187 respectively and spring pressed driving pawl connections 191 (Figs. 11 and 13) exist between each of the gears and their respective ratchet wheels. A bracket 188 secured to one wall of the casing of the gear reduction device 160 serves to support at one end thereof a horizontal shaft 190, the other end of this shaft being anchored to the vertical center partition wall 50. An integral gear unit 192 including a small gear 194 which meshes with the gear 182, is loosely disposed on the shaft 190. A similar integral gear unit 196, including a small gear 198 which meshes with the gear 184, is also disposed on the shaft 190. A third gear unit 200 including a small gear 202 meshing with the gear 186 is likewise loosely mounted on the shaft 190. The gear units 192, 196 and 200 include respectively larger toothed ratchet wheels 204, 206 and 208 of equal diameter which constitute driving members for selectively driving the gears 182, 184 and 186 through the gears 194, 198 and 202 which are integral therewith and consequently for driving the sleeve 181 upon which they are mounted.

The gears 182, 184 and 186 are adapted to be selectively driven from the gears 194, 198 and 202 respectively to impart different rates of turning movement to the sleeve 181 and consequently to the drive shaft 112 through the gear reduction device 160. Accordingly, each of the gear assemblies 192, 196 and 200 has associated therewith a driving pawl assembly 210 (Fig. 13) including spaced arms 212 pivoted on the shaft 190 and carrying medially thereof a pivoted pawl proper 214 which is spring pressed as at 216 for constant yielding engagement with the periphery of the wheels 204, 206 or 208 as the case may be, with which it is associated. The upper end of each of the arms 212 carried a cam-engaging follower 218 in the form of a roller designed for engagement with respective cam elements or discs 200, 222 and 224 mounted on a manually settable shaft 226, one end of which is journaled in the side plate 48. A coil spring 230 has one end thereof anchored to a pin 232 formed on each arm 212 and the other end of the springs are anchored to a bracket 236 mounted on an inclined block 238 extending between and supported from the wall 50 and side plate 48. Thus it will be seen that the arms 212 of the various pawl assemblies are normally urged in a counter-clockwise direction, as shown in Fig. 13. The angular position of the shaft 226 may be adjusted by means of an adjusting knob 262 carried on the shaft externally of the side plate 48.

Each pair of arms 212 carries medially thereof a cam follower 240. The followers 240 are designed for engagement with respective driving cams 246, 248 and 250 (Figs. 12, 13, 14 and 17) which are mounted on a horizontal continuously rotatable shaft 252 and are designed for rotation in unison. The shaft 252 is rotatably journaled in the side plate 48 and wall 50 and one end thereof projects completely through the wall 50 (Fig. 14) and carries thereon a gear 254 which meshes with a gear 256 mounted on a shaft 258. The shaft 258 constitutes the driven shaft of a gear reduction device 260 associated with the motor M.

The cam member 246 is of lobed design and is provided with four cam protuberances on its periphery. The protuberances are arranged 90° apart so that upon each revolution of the shaft 252 the driving pawl mechanism 210 will be actuated four times, or in other words, the spaced arms 212 will be moved from their retracted position to their advanced position and returned four times during each cyclic revolution of the cam 246. The cam member 248 is of lobed design and is provided with two cam protuberances which are oppositely disposed on the periphery thereof so that upon each revolution of the shaft 252 the pawl mechanism associated therewith will be actuated two times during each cyclic revolution of the cam to index the ratchet wheel 206 two times. Similarly, the cam member 250 is provided with a single cam protuberance thereon so that upon each cyclic revolution thereof the ratchet wheel 208 will be indexed a single time.

Each of the cams 220, 222 and 224 is provided with a relatively deep peripheral cam notch 264, a notch 266 of moderate depth, a notch 268 of relatively shallow depth and a series of notches 270 of equal depth, all of which are offset further from the center of the shaft 226 than the relatively shallow notch 268.

If the angular setting of the shaft 226 is such that one of the cam followers 218 is in register with the cam notch 264, the arms 212 are capable of a comparatively great degree of angular swinging movement in order that the pawl 214 may impart a comparatively large degree of turning movement to the ratchet wheel whose movements it controls. When the shaft 226 is so oriented that one of the followers 218 is in register with the cam notch 266 on one of the three cams 220, 222 or 224, the pawl arms 212 associated with this cam are capable of a lesser degree of reciprocation. When the shaft 226 is so oriented that one of the followers 218 is in register with the cam notch 268 on one of the three cams, the arms 212 are capable of a comparatively small degree of angular oscillation. When the shaft 226 is so oriented that one of the cam followers 218 is in register with any one of the extremely shallow notches 270, the cam follower 240 associated therewith is beyond the range of the driving cam 246, 248 or 250 with which it is associated and no movement of the pawl arms 212 obtains.

The three cams 220, 222 and 224 are identical in design but are differently positioned or oriented on the shaft 226, the arrangement being such that only one of the driving pawl assemblies 210 may become operative at one time or that none of them is operative. In one position of the shaft 226 all three of the followers 218 fall into registry with respective shallow notches 270 and all three driving followers 240 are maintained beyond the range of the cams 246, 248 and 250. In another position of the shaft 226 two of the followers 218 will fall into register with respective shallow notches 270, while the third follower 218 will fall into register with one of the notches 268 on one of the cam members 220, 222 or 224, as the case may be. With such a setting of the shaft 226 one of the driving cam followers 240 will be within the range of one of the three cams 246, 248 or 250, as the case may be, and the driving area will be such that relatively short strokes are applied to the pawl arms 212 for driving one of the wheels 204, 206 or 208 throughout relatively small increments of movement. In still another position of the shaft 226, two of the followers 218 will be in register with respective shallow notches 270, while the third follower 218 will be in register with one of the notches 266 of moderate depth on the cams 220, 222 or 224. In this position of the shaft 226 comparatively longer strokes are attained by the operative pawl arm 212 and the wheel 204, 206 or 208, which is driven thereby, will be moved throughout comparatively larger increments of motion. In still another position of the shaft 226 two of the followers 218 will still be in register with respective notches 270, while the third follower 218 will be in register with the notch 264 of comparatively great depth on one of the cams 220, 222 or 224. In this position of the shaft 226 maximum increments of motion are applied to the driven wheel 204, 206 or 208, as the case may be. From the above description it will be seen that only one of the ratchet wheels 204, 206 and 208 may be driven for a particular setting of the shaft 226. Depending upon this setting, however, the degree of motion applied to the driven ratchet wheel at each indexing thereof may be varied.

From the above description it will be seen that by the simple expedient of adjusting the angular position of the shaft 226 selection of a particular set of gears may be made and the extent to which the selected gears are indexed may be controlled.

Because of the fact that the driving cam 246 is continuously rotatable and is possessed of four cam protuberances at its periphery, the frequency with which the pawl arm 212 associated therewith becomes indexed remains the same regardless of the setting of the shaft 226. This cam is designed for use under conditions of 50% tracer firing and under such conditions the tracer blank media is indexed four times during each cyclic revolution of the cam. Different speeds of paper movement under the control of this cam are attained, however, by virtue of the difference in the sweep of the arm 212 as controlled by the setting of the cam 220. The pawl mechanism 210 associated with the cam 248 is designed for operation under conditions of 25% tracer firing and in such an instance the paper is indexed twice during each cyclic revolution of the cam 248. Again, different speeds of paper movement under the control of this latter cam may be attained by shifting the angular position of the cam 222. The pawl mechanism 210 associated with the cam 250 is designed for use under conditions of 12½% tracer firing and the paper is indexed once during each revolution of the cam. Different speeds of paper movement under the control of the cam 250 are effected by the angular setting of the cam 224.

By virtue of the arrangement just described, each of the indexable gear assemblies that controls the rotation of the shaft 112 is capable of being indexed throughout three different degrees of movement to attain three different degrees of linear paper fed at each indexing operation for 12½%, 25% or 50% tracer firing, as the case may be. Under conditions of 50% tracer firing, the frequency of indexing is two times that employed under conditions of 25% tracer firing and is four times that employed under conditions of 12½% tracer firing. All in all, the paper issuing from the rolls 110 and 130 is adapted to be fed to and through the paper frame unit in step-by-step fashion at nine different rates of feed, depending upon both the frequency and extent of the indexing operations.

Figure 20:
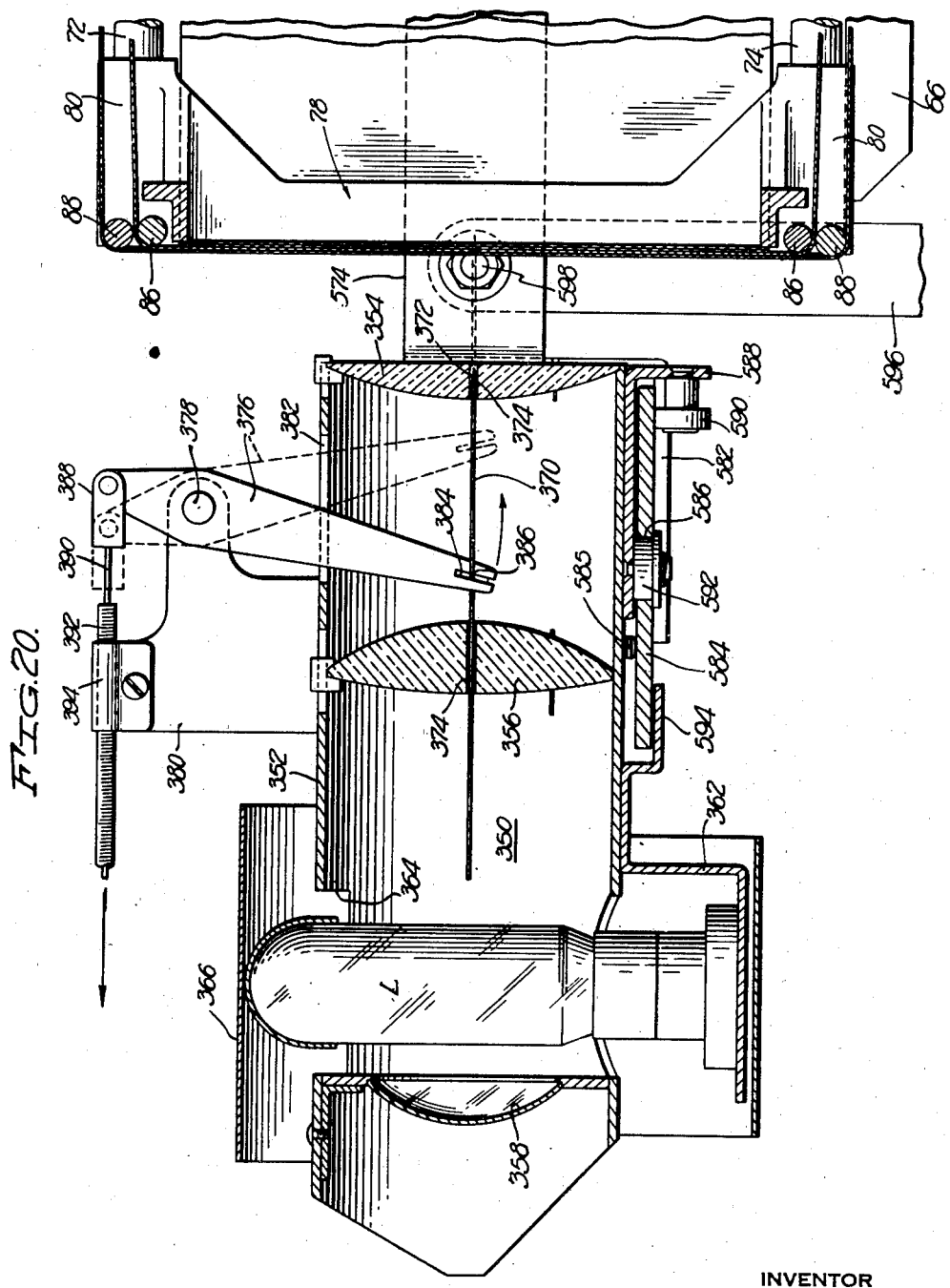
Fig. 20 is an enlarged detail sectional view taken substantially centrally through a light tube assembly employed in connection with the present invention.

Referring now to Fig. 20, the four layers of paper, which exist in contiguity at the rear end of the paper frame unit and which are adapted to be moved simultaneously in step-by-step fashion in four different directions, constitutes what has heretofore been referred to as a composite tracer blank medium, the area of which is correlated with the larger area afforded by the projection screen 16. In order to project tracer spots on the target screen, means are provided for the placement punching of small holes through this correlated area and for immediately thereafter projecting a concentrated beam of light through the punched holes. Since the area of the tracer blank media at the rear of the paper frame is correlated with the effective area of the target projection screen, application of the holes to the media in this area will cause corresponding placement of the tracer spots upon the target screen.

To control proper placement of the tracer spots on the screen, an objective lens 300 (see Figs. 2 and 6) is positioned in front of the correlated area of the tracer blank media and is suitably supported in a spider-like lens mounting 302 having outwardly extending arms 304, the outer ends of which are formed with sleeves 306 that are slidably mounted upon the upper longitudinal rods 72 of the paper frame unit 70. Clamping screws 308 are threadedly received in the sleeves 306 for the purpose of clamping the lens support 302, and consequently the lens 300, in any desired longitudinally adjusted position in order that proper focusing of the tracer spots on the screen may be effected.

In Fig. 5b the effect of placement punching of small holes or apertures in the composite tracer blank media is illustrated. This view shows the arrangement of the paper layers p1, p2, p3 and p4 shortly after the placement punching of aligned apertures through the composite tracer blank media. Immediately after withdrawal of the punching medium or needle and before the paper layers have had time to move from their initial positions at the time of punching, the four holes in the layers p1, p2, p3 and p4 are aligned so that, as a consequence, a circular spot of light is projected upon the screen. This full size circular spot of light does not remain on the screen indefinitely for as the layer p1 moves downwardly and the layer p2 moves upwardly, the upper and lower regions of the spot are curtailed. Similarly, as the layers p3 and p4 move laterally in opposite directions, the size of the spot is curtailed and the spot assumes the size and shape shown in Fig. 5b in the center of the circle-pattern. The size of the spot in Fig. 5b may represent its condition after several successive movements of the paper layers. Eventually the spot will grow smaller and smaller until it disappears altogether.

Referring now to Figs. 2, 3, 5 and 20, the means whereby the small holes or apertures are applied to the effective correlated area of the tracer blank media comprises a movably mounted light tube assembly which is designated in its entirety at 350. This light tube assembly involves in its general organization a substantially cylindrical casing 352, the forward end of which has mounted therein a lens 354 which is of plano-convex design. A double convex lens 356 is suitably mounted within the casing 352 medially thereof and a reflector 358 serves to close the rear end of the casing. A source of light in the form of an electric lamp L, suitably supported on a bracket 362 affixed to the casing 352, projects transversely through the casing 352 and has its filament suitably centered in front of the reflector 358. The lamp L passes through an opening 364 in the upper region of the casing and an open shield 366 is positioned over the top of the lamp L, the shield and opening 364 affording suitable ventilation for the lamp L to allow heat issuing therefrom to escape from the casing.

The paper piercing element per se is in the form of an elongated plunger or needle 370, the forward end of which is sharpened as at 372 for paper punching purposes. The needle 370 is slidably supported in the two lenses 354 and 356 and toward this end a relatively small axial bore 374 is drilled through each of the lenses and the two bores exist in axial alignment when the lenses are properly mounted in position within the casing 352.

The needle 370 is slidable axially of the tubular casing 352 from the retracted position shown in full lines in Fig. 20 wherein its pointed end is withdrawn completely into the lens 354, to the advanced dotted line position thereof wherein the pointed end penetrates and passes completely through all four layers of the composite tracer blank media in the area thereof which is correlated with the projection screen area. As will be made clear presently, the entire light tube assembly 350 is movable both vertically and horizontally in universal fashion in order that the needle 370 may pierce the paper at any one of innumerable points. The exact position of the light tube assembly 350 is determined by the aiming of the dummy weapons 18 at the target existing on the screen 16 and the mechanical connections whereby the movements of the light tube assembly are correlated with the movement of the turret assembly 10 will be described subsequently. In order to move the needle 370 from its retracted position to its advanced position for paper piercing purposes, a trigger member 376 is pivoted as at 378 medially of its ends to a bracket 380 secured to the upper portion of the casing 352. The trigger 376 projects downwardly through an opening 382 provided at the top of the casing 352. At its lower end the member 376 is bifurcated as at 384. The needle is provided with an offset portion 386, which portion is straddled by the bifurcations 384 in order that upon oscillation of the trigger 376 its movements will be followed by the needle. The upper end of the trigger 376 has pivoted thereto a link 388 to which there is attached one end of a Bowden wire 390 having a flexible tube 392 which is clamped adjacent one end thereof in a bracket 394.

The needle operating trigger member 376 is relatively narrow and the needle 370 is of comparatively small diameter and thus neither of these two elements creates any appreciable optical disturbance to the transmission of light issuing from the lamp L through the lenses 356 and 354. The lenses 356 and 354 constitute in combination a condenser lens assembly whereby light issuing from the lamp L is directed to and focused upon the hole created by the needle 370 each time it penetrates the composite paper layers in the effective correlated area at the rear of the paper frame. As will appear presently when a description of the manner in which the light tube assembly 350 is moved, the axial center line passing through the lenses 356 and 354 is at all times directed so that it will intersect an objective lens 300 (Figs. 2 and 6) which is positioned in front of the composite paper layers. Thus, whenever the piercing needle 370 is actuated and caused to penetrate the four paper layers to produce an aperture therein, light issuing from the lamp L will, by virtue of the lenses 356 and 354, be concentrated on an area immediately surrounding and including the pierced aperture and the light passing through this aperture will be directed through the lens 300 regardless of the particular localized region of the correlated area of the paper layers which is undergoing piercing.

The Bowden wire 390 and its sheath or tube 392 extends around the various trace projector instrumentalities, as shown in Fig. 3, and is carried downwardly, as shown in Fig. 8, and is clamped by a clamping member 400 adjacent its lower end, the member 400 being suitably supported upon the box-like casing of the gear reduction unit 160 which encloses the driving gears for the vertically extending paper feed shaft 112. The lower end of the Bowden wire proper 390 has attached thereto a clip 402 which is formed with a key slot 404 therein. A guide rod 406 projects upwardly from a horizontal plate 407 carried between the walls 48 and 50 and serves as a guide for a substantially vertically disposed link 408 having a horizontal flange 410 which is provided with an aperture 412 through which the guide rod 406 extends. The link 408 is provided with a laterally projecting stud 414 which passes through the key slot 404, thus operatively connecting the Bowden wire 390 to the link 408.

The upper end of the link 408 is provided with a universal connection 416 by means of which it is secured to and suspended from a rocker arm or follower 418, one end of which is secured as at 420 to a laterally shiftable operating rod 422 slidable in a sleeve 424 secured to the side wall 48 of the machine. A spring pressed ball 426 (Fig. 9) cooperates with a plurality of grooves 428, 430 and 432 to maintain the rod 422 in any one of three operating positions. An operating knob 434 is formed on one end of the operating rod 422 exteriorly of the machine casing and is adapted to be manually manipulated for shifting the position of the rod 422. The follower 418 is pivotally secured adjacent the end thereof remote from the link 408 to the inner end of the operating rod 422 and this latter rod forms the sole support for the follower. A roller 436 is mounted on the follower 418 medially thereof and is adapted to selectively ride on the periphery of any one of three cam wheels 438, 440 and 442 mounted on the shaft 252 which carries the operating cams 246, 248 and 250, as shown in Fig. 14. This latter group of cams is arranged in a cluster adjacent the partition wall 50 and, as shown in Figs. 9 and 17, the former group of cams, namely 438, 440 and 442, is arranged in a cluster near the side plate 48 of the machine.

The cam wheel 438 is designed to accommodate conditions of 50% tracer firing wherein every other bullet is a tracer bullet. Toward this end, it is provided with a series of four equally spaced cam depressions 444 therein. The cam wheel 440 is designed to accommodate conditions of 25% tracer firing and toward this end it is provided with a pair of diametrically opposed cam depressions 446. The cam wheel 442 is designed to accommodate conditions of 12½% tracer firing and accordingly it is provided with a single cam depression 448 thereon.

Since the operating rod 422 is laterally shiftable by means of the knob 434 to any one of three predetermined positions, the roller 436 carried by the follower 418 is shiftable for engagement with the periphery of any one of the three cam discs 438, 440 or 442.

The follower 418 has mounted thereon a latch plate 450, and a latch member 452 cooperates therewith to normally maintain the follower 418 elevated so that the roller 436 carried thereby may not enter the various cam depressions 444, 446 or 448 on the particular cam wheel with which it is associated. The latch member 452 is integrally formed on the armature 454 of a needle-operating or Bowden wire magnet BM, the latch and armature assembly 452, 454 being pivoted as at 456 for tilting movement and being normally biased by means of a spring 458 to a position wherein the armature 454 is remote from the magnet core and the latch member 452 is operative to maintain the follower 418 elevated. It will be seen that upon energization of the magnet BM the armature 454 will be attracted downwardly toward the magnet core and the latch member 452 will be moved to the right, as viewed in Fig. 8, to release the latch plate 450, and consequently the follower 418, in order that the roller 436 may, in traversing the peripheries of the various cam wheels 438, 440 or 442, as the case may be, fall into the cam depressions 444, 446 or 448.

Since the free end of the follower 418 is connected by means of the link 408 and stud 414 to the Bowden wire proper 390, it will be seen that each time the roller 436 enters any one of the cam depressions 444, 446 or 448, the link 408 will be moved downwardly, thus drawing the Bowden wire 390 with it and causing the needle 370 (Fig. 20) to be moved to its advanced position for paper punching purposes.

The shaft 252 which carries the two cam clusters, namely 246, 248, 250 and 438, 440, 442, is continuously driven from the motor M by means of the bevel gears 254 and 256 previously mentioned.

The magnet BM is electrically connected to the dual trigger mechanism 26 of the free gun assembly 10 in a manner that will be set forth when the circuit connections for the machine are described. This magnet normally remains deenergized when no pressure is applied to the trigger and is adapted to become energized during such time as the trigger is depressed, thereby causing the latch member 452 to release the latch plate 450 and setting the needle operating mechanism into repetitious operation. Upon releasing the trigger, the magnet BM becomes deenergized and the latch plate 450, in assuming its uppermost position, is engaged by the latch member 452 so that the follower 418 remains elevated and the needle operating mechanism becomes inoperative.

Still referring to Figs. 8 and 9, the free end of the follower arm 418 is provided with a contact operating finger 421 thereon designed for engagement with a pair of normally open contacts bmc, hereinafter referred to as the Bowden wire contacts, the function of which will be explained subsequently. The lower contact of the contact group bmc is mounted upon a leaf 423, while the upper contact is carried by a leaf 425, the two leaves being secured to an insulating block 427 suitably supported upon the machine framework. The leaf 425 is provided with a forwardly extending finger 429 designed for engagement with a pin 431 mounted on the free end of the follower arm 418. It will be seen that with the follower arm 418 in the position shown in Fig. 8, wherein it is elevated, the finger 429 is maintained elevated by the pin 431 and, as a consequence, the pair of contacts bmc are normally maintained open. However, when the roller 436 rides into any one of the cam depressions 444, 446 or 448 provided on the cams 438, 440 and 442, the forward end of the follower arm 418 will be moved downwardly carrying the pin 431 with it and allowing the contacts bmc to become closed.

Figure 11:
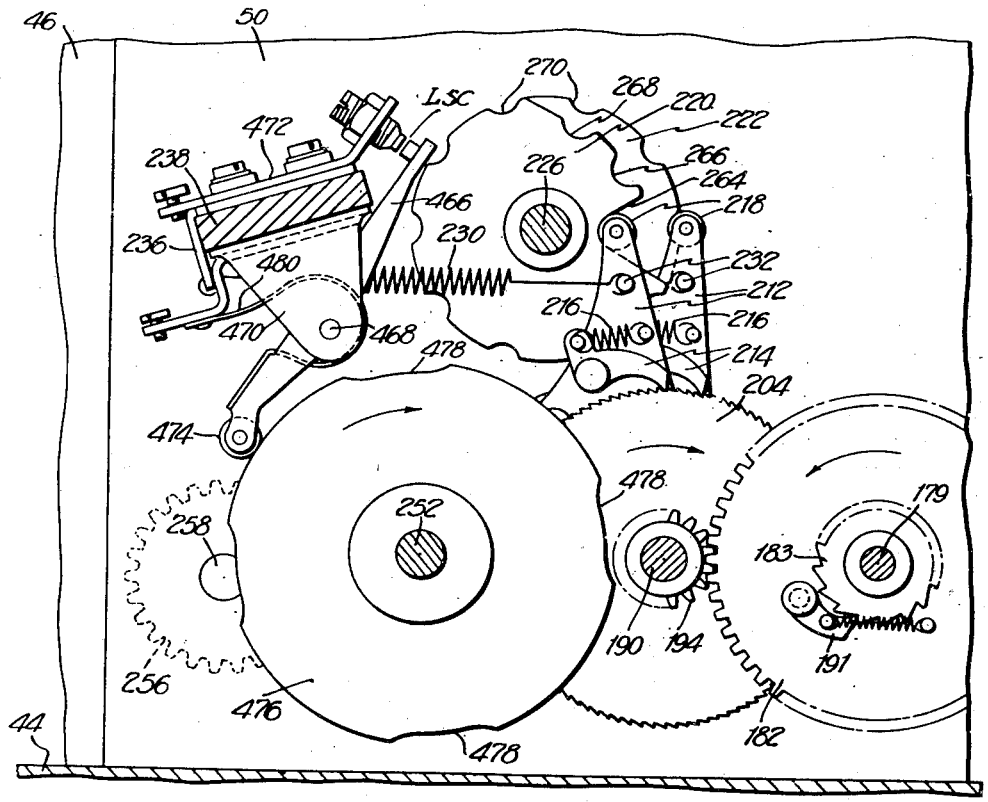
Fig. 11 is a sectional view taken substantially along line 11—11 of Fig. 6.
Figure 12:
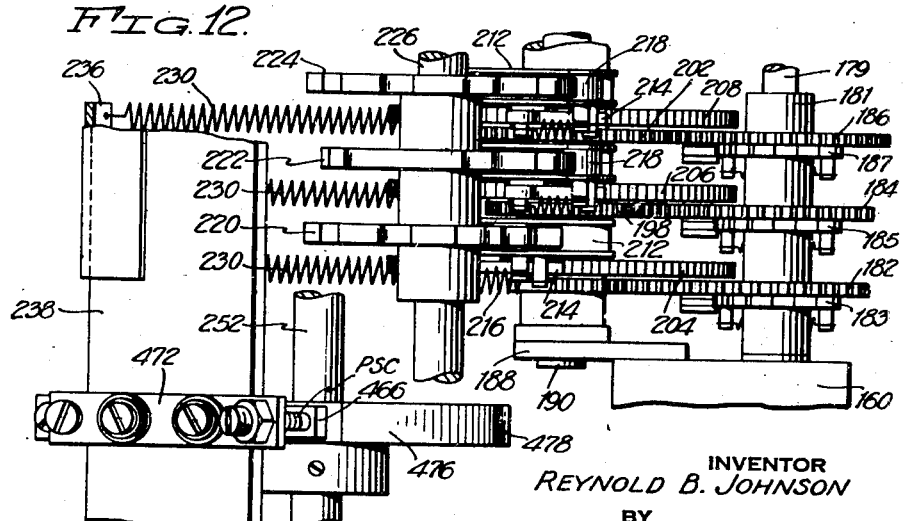
Fig. 12 is a top plan view of the structure shown in Fig. 11.

As has previously been stated, means are provided whereby acoustical effects are attained which closely simulate actual combat conditions of firing. Toward this end, a plurality of loud speakers of conventional form, such as are employed in connection with ordinary radio apparatus, may be mounted at suitable points in or around the apparatus. The particular location of these loud speakers is immaterial and, for convenience, two of them, which have been designated at LS, are shown as being disposed within the turret compartment on each side of the operator, while a third loud speaker LS is mounted within the cabinet 40 on which the trace projector trainer proper is mounted. These loud speakers are electrically connected together in parallel arrangement and are contained within an electrical circuit including a circuit maker and breaker in the form of a pair of contacts lsc (Fig. 11). One of the contacts lsc is carried at the outer end of an arm 466 which is pivoted as at 468 between the arms of a U-shaped bracket 470 mounted on a terminal block 472. The other end of the arm 466 carries a cam follower 474 designed to ride upon the periphery of a cam 476, hereinafter referred to as the noise cam, and mounted upon the shaft 252 which carries the cam clusters 246, 248, 250 and 438, 440, 442. The noise cam 476 is positioned medially between the two cam clusters just mentioned and is provided with a series of four peripheral depressions 478. A spring 480 associated with the contact assembly lsc bears against the arm 466 to bias the latter in such a direction that the cam follower 474 will at all times remain in contact with the periphery of the cam 476. The specific nature of the loud speaker circuit will be set forth when the electrical features of the invention are considered. It is to be noted, however, that the operation of the noise cam 476 and its controlled contacts lsc remain the same whether the apparatus is being operated under conditions of 12½%, 25% or 50% tracer fire inasmuch as in each of these instances the same amount of ammunition is consumed.

Figure 21:
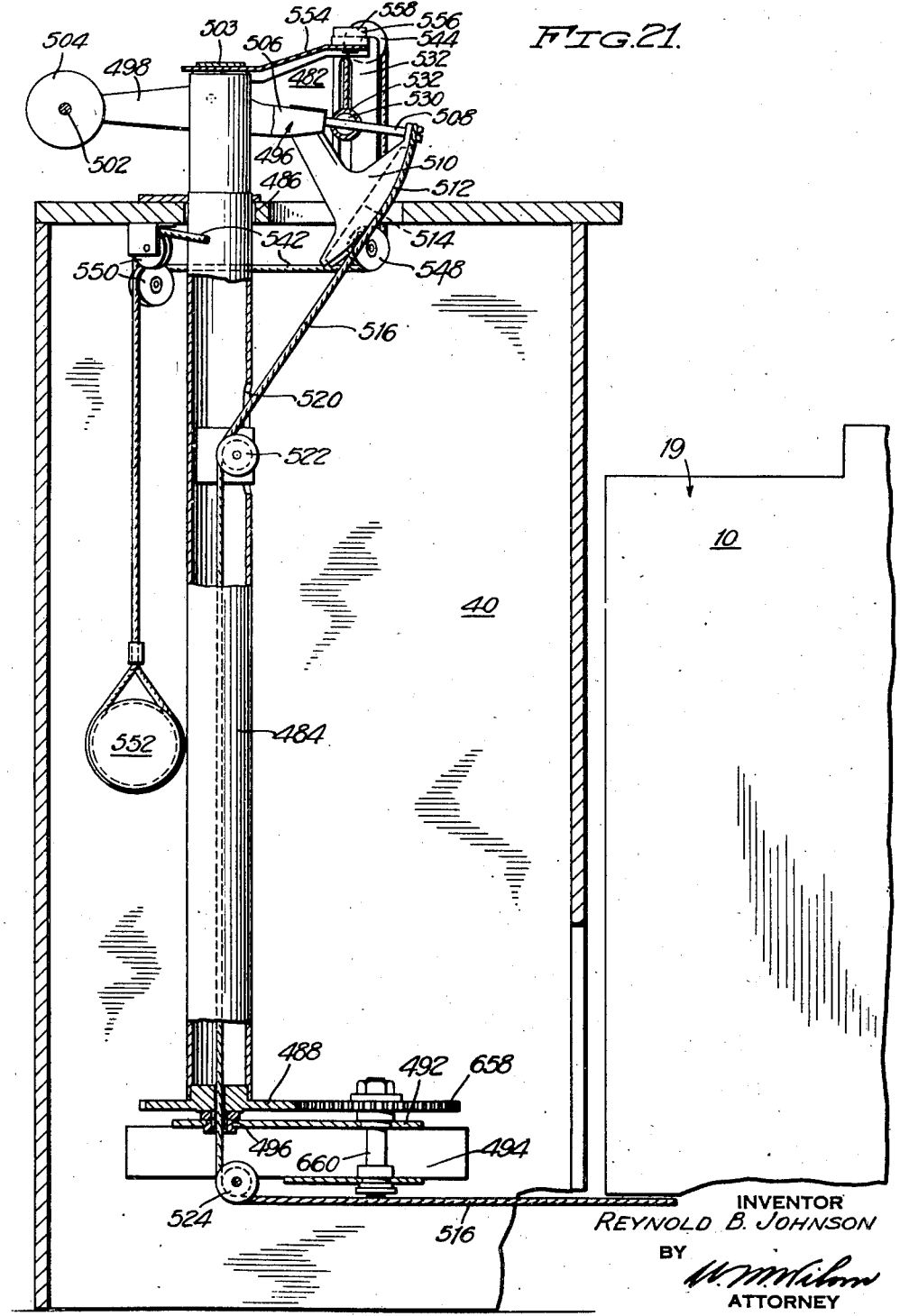
Fig. 21 is a fragmentary, side elevational view, partly in section, showing the mechanical cable connections by means of which the sub gun assembly is connected to the free gun assembly and is caused to follow the elevational and horizontal swinging movements of the latter.
Figure 22:
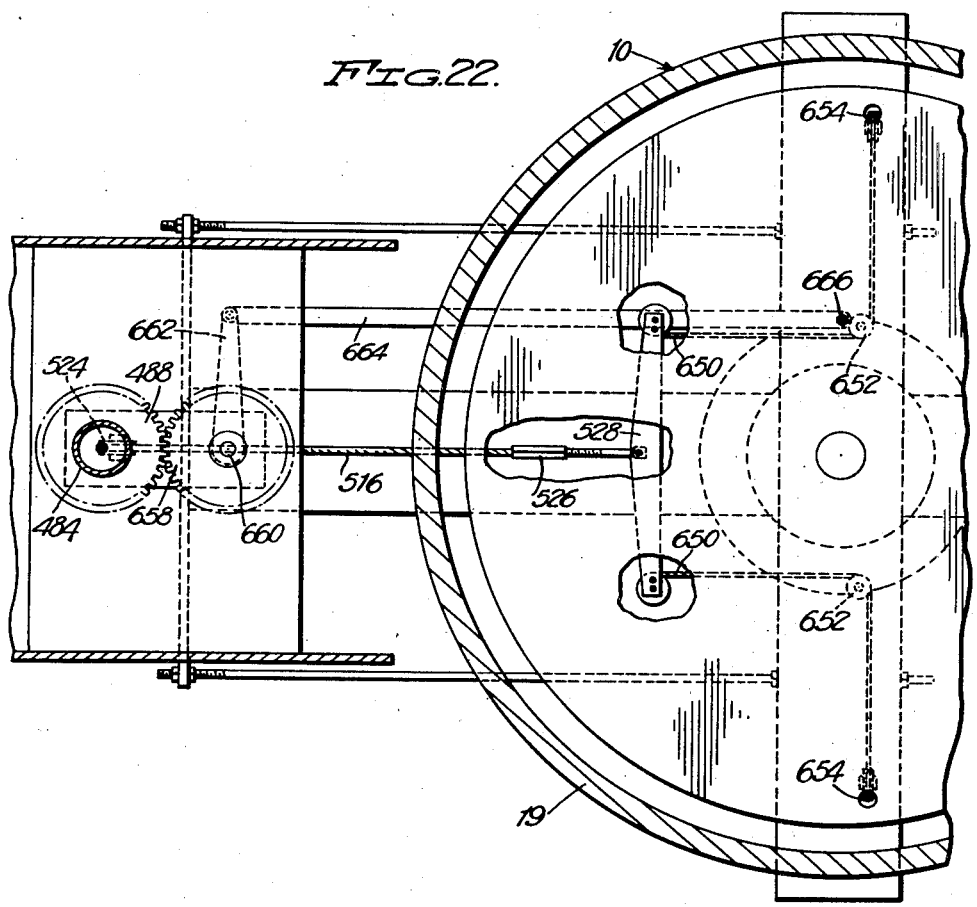
Fig. 22 is an enlarged sectional view taken substantially along the line 22—22 of Fig. 2 and showing the mechanical cable connections for the free gun assembly.
Figure 23:
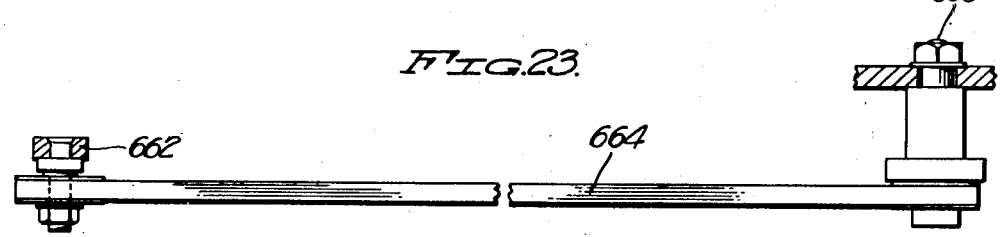
Fig. 23 is a detailed fragmentary side elevational view of the mechanical link connections existing between the free gun assembly or turret and the trace trainer mechanism, by means of which the latter is caused to follow the lateral swinging movement of the former.
Figure 27:
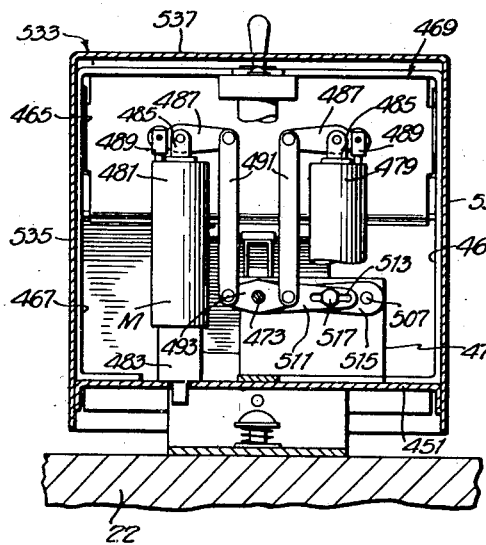
Fig. 27 is a sectional view taken substantially along the line 27—27 of Fig. 25.
Figure 28:
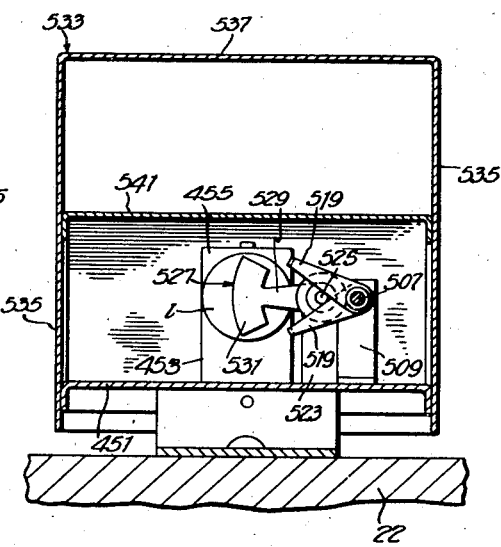
Fig. 28 is a sectional view taken substantially along the line 28—28 of Fig. 25.
Figure 24:
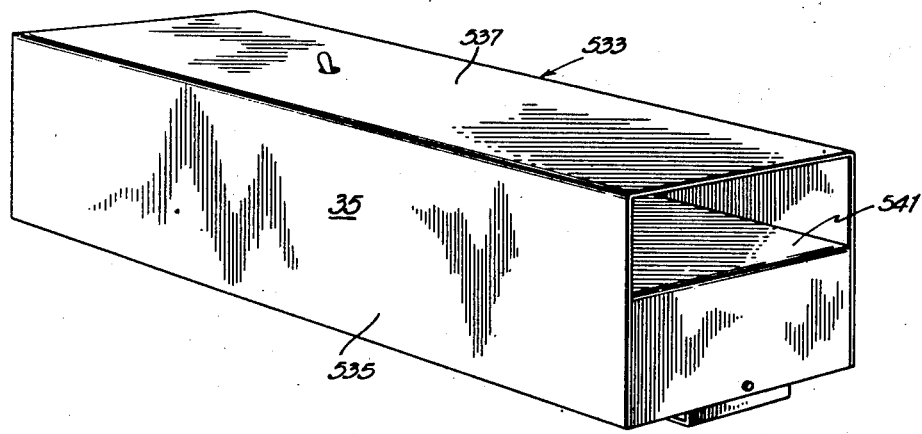
Fig. 24 is a perspective view of an initial trace unit employed in connection with the present invention.

The needle-carrying light-tube assembly 350 of Fig. 20 is capable of both horizontal and vertical components of movement coupled with a limited amount of angular turning movement, in order that a beam of light issuing from the lamp L and passing through the lenses 356 and 354 will be directed through the perforations in the composite layers of paper media and caused to fall upon the objective lens 300. These various components of movement are predicated upon the orientation of what is herein termed as a sub gun assembly 482, shown in detail in Fig. 21. The sub gun assembly is movably mounted on the upper end of a tubular support 484 which projects upwardly through the cabinet 40 and extends through an opening 486 in the top thereof. This tubular member 484 will hereinafter be referred to as the train shaft and its lower end is supported upon a horizontally disposed gear 488 which is rotatably journaled as at 490 on a bed plate 492 suitably supported above a platform 494 extending across the bottom of the cabinet 40. The train shaft 484 derives turning movement in either direction from the gear 488 upon which it is supported and the gear 488 in turn is driven by means of a mechanical coupling, hereinafter to be described, leading to the free gun assembly 10. The sub gun assembly proper involves in its general organization a tiltable arm 496 (Figs. 3, 4, 5, 16, 17 and 21) consisting of a pair of parallel side portions 498 in which there are disposed a pair of oppositely positioned anti-friction bearing members 499 which serve to rotatably support a pair of trunnions 500. The trunnions 500 project laterally through the side members 501 of an inverted U-shaped yoke 503 which is secured by means of screws 505 to the upper end of the vertical train shaft 484. The rear ends of the side members 498 serve to support therebetween a horizontal rod 502 on which there is mounted a series of cylindrical counterweights 504, the purpose of which is to counter-balance the weight of the light tube assembly 350 together with the cradles associated therewith and which will subsequently be described. The forward ends of the side members 498 are brought together and coupled by means of a bracket 506 from which there projects forwardly and outwardly a rod 508, hereinafter referred to as the elevation arm rod. A cable guiding bracket 510 depends from the forward end of the composite arm 496 and is provided with an arcuate surface 512. The bracket 510 is relatively narrow and a pair of cable confining or guide plates 514 are suitably secured to opposite sides of the bracket and form therebetween a groove in which a cable 516 is confined. One end of the cable 516 is secured by means of a stud 518 to the outer end of the elevation arm rod 508 and the cable passes through an opening 520 formed in the wall of the train shaft 484 and over a pulley 522 and from thence downwardly through the shaft and through the center of the gear 488 which is recessed for the purpose. Adjacent the bottom of the cabinet 40 the cable 516 passes beneath a pulley 524 and extends laterally, as shown in Figs. 21 and 22, and is attached at its other end to an extensible coupling member 526 which is in turn attached to the center medial point of a horizontal draw bar 528, the nature and function of which will appear presently and from which bar the sub gun assembly 482 derives its vertical or elevational swinging movements.

The elevation arm rod 508 (Figs. 3 and 21) slidably supports thereon a hollow ball member 530 which is contained within, and is adapted to travel in, a hollow tubular member 532 (Fig. 3) hereinafter referred to as the ball tube. The ball tube 532 is slotted as at 534 on opposite sides thereof and the elevation arm rod 508 projects through the two slots thereof.

The ball tube 532 is provided at opposite ends thereof with a pair of thrust bearings 536 from which there projects outwardly a pair of studs 538 which project through a pair of vertically extending slots 540 (see Figs. 3 and 4) formed adjacent the rear edge of the side plates 46 and 48 and by means of which the ball tube 532 is guided for vertical up and down movement. The studs 538, in addition to their guiding function, also serve as clamping members for attachment thereto of a pair of cables 542 which pass upwardly and over a pair of pulleys 544 mounted on the plates 46 and 48 and from thence downwardly through small slots 546 formed in the table portion 44 of the cabinet 40. Immediately below the table portion 44, the cables 542 extend laterally around a pair of pulleys 548 (see Fig. 21) from whence they converge toward a pair of pulleys 550 suspended from the table top 44. From the pulleys 550 the two cables 542 extend downwardly in close proximity to one another and at their lower ends these cables serve to support therebetween a cylindrical weight 552, the function of which is three-fold, namely, to assist the action of the weight 504 as a counterbalance for the light tube assembly 350 and its associated moving parts; to operate through the sub gun assembly 482 and take up any slack that may exist in the cable 516; and to maintain the ball tube 532 horizontal at all times and prevent unwanted tilting of the light tube assembly 350, as will be made clear presently.

The sub gun assembly 482, in addition to the tiltable arm assembly 496, 510, etc., just described, also includes a horizontal swingable but non-tiltable train arm assembly including an arm proper 554, the rear end of which is secured to the upper end of the train shaft 484 by means of the screws 505 which pass through the yoke 503. The forward end of the train arm 554 has mounted thereon a cylindrical boss 556 (see also Fig. 5a), the upper surface of which is formed with a longitudinally extending channel 558, the boss 556 being fixedly secured to and movable with the arm 554. A cooperating member 560 is provided with a roller 562 on its underneath surface designed for reception in the channel 558. The member 560 is formed with a centrally disposed, upwardly extending pin 564, on which there is loosely disposed an upper guide roller 566 and a lower guide roller 568, which rollers function in a manner that will be described presently to impart angular swinging movement to the light tube supporting and actuating instrumentalities.

Referring now to Figs. 3, 4, 5, 5a, 16, 17 and 20, the previously described light tube assembly 350 is capable of both horizontal and vertical components of movement, during which movements the angular position or orientation of the tube proper is altered so that light issuing from the filament of the lamp L and passing through the lenses 356 and 354 and through apertures formed by the needle 370 in the various layers of paper in the correlated area of the tracer media will at all times be directed toward the objective lens 300. Despite the angular or tilting components of motion which are imparted to the light tube proper, these movements are so designed that the center point on the plane surface of the lens 354 is at all times equidistant from the plane surface of the correlated area of the tracer blank media. In other words, the loci of movement of this center point on the lens 354 exists as a plane which is parallel to the plane of the tracer blank media. By this expedient optimum optical conditions for efficient tracer simulation are attained and the effects of spherical aberration on the screen are overcome.

Toward these ends, the light tube assembly 350 is supported in and guided by a cradle 570 (Figs. 3, 4 and 5), hereinafter referred to as the elevation train cradle, by means of which the light tube is caused to move vertically, while at the same time altering its angular position with respect to a horizontal plane. The light tube assembly 350 is also supported in and guided by a cradle 572, hereinafter referred to as the horizontal train cradle, by means of which horizontal components of movement, accompanied by angular displacement, are imparted to the light tube.

The elevation train cradle 570 just referred to includes a pair of parallel arms 574, the forward ends of which are provided with slots 576 adapted to receive therein pins or trunnions 577 which project outwardly and laterally from the side plates 125 near the forward edges of the latter. The side plates 125 are each formed with a forwardly bowed arcuate slot 578 adjacent its forward edge and a pin 580 carried medially of each arm 574 is adapted to be received and have sliding movement in the respective slots 578. The arms 574 are therefore in effect pivotally attached adjacent their forward ends to the side plates 125 and are capable of swinging movement in vertical planes about the center of a horizontal axis which shifts to a certain extent when swinging movement of the arms occurs. The free ends of the arms 574 have secured thereto a pair of angle pieces 582 across which there extends a supporting plate 584 having formed therein a rearwardly bowed arcuate slot 586.

Referring now to Figs. 3 and 20, the underneath portion of the cylindrical light tube casing 352 has secured thereto an L-shaped bracket 588 which carries a vertically disposed roller 590 which underlies the forward edge portion of the supporting plate 584 and bears upwardly against the underneath surface of this latter plate to ride thereon during the horizontal movements of the light tube assembly. The bracket 588 also carries a horizontally disposed roller 592 which projects into the slot 586 and is adapted to travel therein during horizontal movement of the light tube assembly. The bracket 362 which, as previously stated, serves as a mounting for the lamp assembly L, is secured to the underneath side of the casing 352 and is provided with an offset flange 594 which underlies the rear edge of the supporting plate 584. A pair of rollers 585 are carried in brackets 587 on opposite sides of the light tube casing 352 near the bottom thereof and are adapted to ride on the plate 584.

From the above description of parts it will be seen that the supporting plate 584 constitutes the sole support for the light tube assembly 350, and the elevational training movements of which the light tube assembly is capable are imparted to it solely by the vertical swinging movement of the elevational train cradle 570 including the supporting plate 584. The roller 590 and flange 594, taken in conjunction with the surface of the light tube casing 352, form in effect a channel for reception of the supporting plate 584 and thus, independently of the horizontal components of motion of which the light tube assembly is capable, its vertical components of motion are controlled solely by the vertical components of motion of the supporting plate 584.

Tilting movement of the elevation train cradle 570 is effected from the ball tube 532 by means of a pair of links 596 (Figs. 3, 4, 5, 16, 17 and 20), the upper ends of which are secured to trunnions 598 that project laterally from the cradle medially thereof and whose lower ends are pivotally secured to the studs 538 provided at opposite ends of the ball tube 532. These links 596 thus constitute in effect thrust members by means of which vertical movement of the ball tube 532 bodily is translated into vertical swinging movement of the elevation train cradle 570 to control the vertical components of swinging movement of the light tube assembly. As has previously been stated, such vertical movement of the ball tube bodily is under the control of the elevational training movements of the turret gun mount or cradle 22.

By virtue of the forwardly bowed arcuate slot 578 provided in the side plates 125, the elevation train cradle 570 is possessed of a degree of longitudinal shifting movement forwardly and rearwardly as the cradle becomes tilted in either direction. Such shifting movement serves to compensate for such movement of the light tube assembly toward and away from the tracer blank media as would normally occur if the elevation train cradle were caused to tilt about a fixed horizontal axis adjacent its forward end. This latter type of tilting movement of the cradle 570 is undesirable, inasmuch as certain conditions of spherical aberration would ordinarily exist on the screen by virtue of the fact that the latter is comprised of a plane surface, whereas the light tube assembly is possessed of a degree of angular tilting movement. The forwardly bowed arcuate slots 578 compensate for the phenomenon of spherical aberration existing between the screen and light tube.

The previously mentioned horizontal train cradle 572, by means of which horizontal and angular components of movement are imparted to the light tube assembly 350, is best illustrated in Figs. 3, 4 and 16. This train cradle is comprised of a pair of generally U-shaped frame members 602, each of which includes an upper horizontal arm 604, a vertically disposed portion 606, an inclined lower portion 608 and a horizontal lower arm 610. The frame members 602 are generally of angle form in cross section. The frame members 602 are spaced from each other throughout a major portion of their extent, as shown in Fig. 16, and the forward portions of the arms 604 converge adjacent the forward region thereof toward a common pivotal point afforded by means of a stud 612 mounted centrally of the cross piece 62. The lower arms 610 also converge in the forward regions thereof toward a common pivotal axis afforded by means of a stud 614 mounted centrally of the plate 52, the two studs 612 and 614 being situated on a common vertical axis. The two frame members 602 are connected together in their medial regions by means of a horizontally disposed plate or web 616, the function of which will become apparent presently. The rear portion of each frame member 602 has secured thereto a guide member or wing 618 in the form of a flat sheet of metal, these wings 618 serving to confine therebetween the body portion or casing 352 of the light tube assembly, while at the same time permitting limited vertical movement bodily as well as limited angular movement of the light tube. In Fig. 3 the light tube assembly 350 is shown as occupying a medial horizontal position between the two wings 618 and thus the elevational train cradle 570 occupies its medial position between its upper and lower limits of swinging motion. When this tter train cradle occupies its uppermost position, the light tube assembly 350 occupies the elevated position shown in dotted lines in Fig. 4. In this position of the light tube assembly, the light tube proper is inclined forwardly and downwardly. The light tube assembly is capable of movement to a lowered position wherein the elevational train cradle is at the limit of its downward swinging movement and in such a position the light tube proper is inclined forwardly and upwardly. The horizontal train cradle 572 is capable of swinging movement laterally about a vertical axis passing through the center of the pivotal studs 612 and 614. In one extreme position thereof the light tube proper occupies an angular position with respect to the longitudinal axis of the machine and is situated adjacent the right-hand side of the machine. In the other extreme position thereof the light tube proper is inclined with respect to the longitudinal axis of the machine and is situated adjacent the left-hand side of the machine. The assembly 350 is capable of such universal movement as is permitted by the relative angular movements of the elevational train cradle 570 and of the horizontal train cradle 572.

Correction for the phenomenon of spherical aberration when the horizontal train cradle 572 shifts laterally is afforded by virtue of the rearwardly bowed arcuate slot 586 formed in the supporting plate 584. Unlike the elevational train cradle 570, which itself is capable of limited longitudinal shifting movement, the horizontal train cradle 572 is pivoted for swinging movement about the fixed vertical axis passing through the studs 612 and 614. By virtue of the horizontally disposed roller 592 which rides in the slot 586, the light tube assembly 350 as a whole is caused to shift its position forwardly or rearwardly in the machine as the horizontal train cradle 572 swings in one direction or the other about its fixed pivot. This longitudinal component of motion of which the light tube assembly 350 is capable is individual to the light tube assembly itself and is not shared by the cradle 572 with which it is associated.

As is most clearly shown in Fig. 3, the Bowden wire assembly 390, 392 passes upwardly from the compartment 54 through an opening 620 provided in the top plate 52 and is secured by means of a clip 622 to the side plate 125. From the clip 622 the Bowden wire passes along the side of one of the swingable arms 604, is anchored thereto by means of straps 624 and makes a comparatively wide reverse loop or bend as at 626 and extends forwardly for reception by the bracket 394. Since the distance between the anchoring clips 622 and the strap 624 is comparatively great and since the horizontal train cradle 572 is possessed of only a limited degree of angular movement, no sharp bends are offered to the Bowden wire in any position of the light tube assembly. Similarly, because of the fact that a considerable extent of the Bowden wire is consumed by the reverse bend 626 thereof, the wire is not curved beyond the limit of its endurance in any of the elevational positions of which the light tube assembly is capable.

The relative position of the horizontal train cradle 572 is dependent entirely upon the angular position occupied by the sub gun assembly 482. Likewise, the relative position of the elevational train cradle 570 is dependent upon the elevational setting of the sub gun assembly.

The mechanism for transferring horizontal angular movement from the sub gun assembly to the horizontal train cradle is best illustrated in Figs. 3, 4, 5, 5a and 16. The top plate 52 has mounted thereon a plurality of upstanding supports 628 by means of which a pair of parallel arms 630 are supported above the top plate in spaced relationship. The arms 630 project rearwardly beyond the rear edge of the top plate and serve to support therebetween a horizontal guide bar 632 which is formed with an elongated straight-sided slot 634 which is substantially coextensive with the bar. The plate or web 616, which extends across the lower horizontal arm 610 of the horizontal train cradle 572, is formed with a longitudinally extending slot 636 which extends inwardly from the rear edge of the plate and which is in register with the slot 634 formed in the bar 632. The pin 564 (Figs. 3 and 5a) formed on the cylindrical slide member 560 projects upwardly from the upper surface of the slide member and passes through both the slots 634 and 636. The lower roller 568, which is loosely mounted on the pin 564, is adapted to ride in the slot 636 of the plate or web 616. The upper roller 566, which is also loosely mounted on the pin 564, is adapted to ride in the slot 634 formed in the bar 632. It will be seen that upon turning movement of the train shaft 484, and consequent angular turning movement of the sub gun assembly 482, the train arm 554 will be swung about the axis of the train shaft. The boss 556 at the outer end of the train arm 554 will describe an arc centered about the axis of the train shaft 484 and the cylindrical member 560 which by virtue of the rib and slot connection 558, 562, will follow the transverse linear path provided for it by the straight-sided slot 634 formed in the bar 632. At the same time, the roller 566 carried on the pin 564 which moves bodily with the cylindrical member 560 will bear against the sides of the slot 634 formed in the member 632 thereby imparting to this latter member a lateral component of motion and thus causing the entire horizontal train cradle 572 to swing about the vertical axis of the studs 612 and 614. During such horizontal swinging movement of the cradle 572 the wings 618 between which the light tube assembly 350 is confined serve to impart to this assembly a transverse horizontal component of motion which, when coupled with the longitudinal horizontal component of motion afforded by the arcuate slot 586, as previously described, gives to the light tube assembly the desired form of movement for proper application of tracer spots to the screen 16.

Still referring to Figs. 3, 4, 5, 5a and 16, vertical angular movement is transmitted from the sub gun assembly 482 to the elevation train cradle 570 through the medium of the vertically shiftable ball tube 532. The hollow ball member 530 which is slidable upon the elevation arm rod 508 is received in the bore of the hollow ball tube 532 and is adapted to travel within this tube longitudinally thereof from one end of the slot 534 to the other end thereof. The inner end of the elevation arm rod 508 is supported in the end of the tiltable arm 496 and the outer end thereof is anchored in a bracket 462 carried at the upper end of the cable guiding bracket 510.

As shown in Fig. 3, when the sub gun assembly occupies its medial position wherein it is in alignment with the longitudinal axis of the apparatus, the ball 530 occupies a position upon the rod 508 in close proximity to the forward end of the arm 496. As the sub gun assembly is moved toward either one of its extreme angular positions, the ball 530 is adapted to ride outwardly on the rod 508 as it follows the path designed for it by the hollow ball tube 532. Elevational training movements of the tiltable arm 496 under the control of the free gun assembly 10, by means of the cable 516, serve to raise or lower the elevation of the ball tube 532, as the case may be, and the latter, through the medium of the links 596 and pins or trunnions 598, serves to cause tilting of the arms 574 and consequently of the entire elevational train cradle 570. As has been set forth previously, such tilting of the elevational train cradle 570 is accompanied by a limited degree of lateral shifting movement of the entire cradle and of the light tube assembly 350 which it serves to support, such shifting being caused by virtue of the forwardly bowed arcuate slots 578 and being permitted by virtue of the pin and slot connections 577, 576.

Referring now to Figs. 1, 2, 3, 21, 22 and 23 wherein the mechanical connections existing between the free gun assembly 10 and the sub gun assembly 482 are illustrated, the draw bar 528 is disposed beneath the turret assembly 19 and is a freely floating member. The medial point of the draw bar is attached to the cable 516, as shown in Fig. 22, and the ends of the draw bar have attached thereto a pair of cables 650 which extend forwardly beneath the turret structure and pass around pulleys 652 located on opposite sides of the vertical axis of the turret. From the pulleys 652 the cables extend laterally outwardly in opposite directions and upwardly around a pair of pulleys 654 located near the periphery of the turret and they are anchored at their upper ends to conveniently placed brackets 656 (see Fig. 2) attached to the tiltable gun mount or cradle 22 on opposite sides thereof. From the above description of parts it will be seen that as the gun mount or cradle 22 is swung about its horizontal axis of tilting movement, the tendency of the draw bar 528 will be to move bodily forwardly or bodily rearwardly, as the case may be, and since it is attached to the cable 516 precisely at its medial point, this tendency of the draw bar to move in one direction or the other when the gun mount is tilted will still exist regardless of the angular displacement of the turret 19. Whether the draw bar is in its normal position or in any position of inclination, tilting movement of the gun mount will cause movement of the draw bar bodily in one direction or the other without disturbing its angular relationship. Obviously, movement of the draw bar bodily either forwardly or rearwardly will cause shifting movement of the cable 516 and consequent elevational movements of the sub gun assembly which, as previously set forth, is translated into corresponding vertical and angular movements of the light tube assembly 350.

Still referring to Figs. 1, 2, 3, 21 and 22, angular turning movement of the turret 19 about its vertical central axis is transmitted to the train shaft 484 through the gear 488. Toward this end, the gear 488 meshes with a gear 658 mounted on the bed plate 492 and carried on a vertical shaft 660. The shaft 660 is provided with a jack shaft 662 to the outer end of which there is connected one end of a horizontal link 664, the other end of the link being pivotally attached as at 666 to an eccentric point on the underneath side of the turret 19.

As the turret 19 is turned about its vertical axis in one direction or the other, the link 664 will be drawn forwardly or rearwardly, as the case may be, thus swinging the jack shaft 662 in one direction or the other and, as a consequence, actuating the two gears 658 and 488 to impart rotary turning movement to the train shaft 484 and to the sub gun assembly 482 carried at the upper end of this shaft. As previously described, such angular turning movement of the sub gun assembly is translated to the horizontal train cradle 572 for proper manipulation of the light tube assembly 350.

As previously stated, means are provided whereby optical effects simulating muzzle flash issuing from the dummy guns 18 may be attained. Since the guns 18 are arranged in parallel side-by-side relationship with the gunner being positioned behind them so that his line of aim passes between the guns, it is desired that for optimum conditions of target visualization no flash shall occur on the region of the screen between the line of aim of the two guns. The flash effects are confined to the region of the screen existing at either side of the two lines of fire of the dummy guns. Accordingly, means are provided whereby a flash of light may be conducted across the target screen 16 from one side thereof to the other, with this flash being discontinued as it approaches the point of aim.

The mechanism 35 for creating the optical illusion of muzzle flash is best illustrated in Figs. 24 to 28 inclusive and is hereinafter referred to as the muzzle flash unit. This unit involves in its general organization a base plate 451 on which there is mounted a bracket 453 which serves to support a mounting 455 for a lamp $l$. A lens 457 mounted in a bracket 459 serves to concentrate light issuing from the lamp $l$ into a beam and to project the latter against the surface of a movable mirror 461 positioned behind the lens. From the movable mirror 461 the light beam is projected against the surface of a stationary mirror 463 mounted on a bracket 465 supported on the side pieces 467 of an inverted U-shaped frame 469 supported on the base plate 451. From the stationary mirror 463 the light beam is projected onto the screen 16.

The movable mirror 461 is mounted on a fixture 471 which in turn is mounted on a horizontal rock shaft 473 suspended in brackets 475 and 477. The movable mirror 461 is inclined with respect to the shaft 473 in such a manner that light issuing from the lens 457 will be reflected generally upwardly against the stationary mirror 463 which is of elongated design and extends completely across the unit between the side members 467.

A pair of solenoids 479 and 481 are mounted on a support 483 carried by the base plate 451 and are provided with cores 485 that are pivoted medially of respective links 487, which in turn are pivoted to fixed lugs 489 mounted on the upper ends of the solenoids. The free end of each link 487 is pivotally attached to a connecting rod or link 491 and the lower ends of the links 491 are secured to the opposite ends of a cross head 493 centered on the shaft 473. The solenoids 479 and 481 exist in respective electrical circuits by means of which alternate energization of solenoids is made possible to cause oscillation of the cross head 493 and consequent oscillation of the shaft 473 and movable mirror 461 about a horizontal axis. The electrical circuits for the solenoids 479 and 481 will be pointed out subsequently during the description of the electrical diagram for the entire machine.

The bracket 477 is comparatively wide and in addition to performing a support for the rock shaft 473 also serves to rotatably support one end of a second rock shaft 507, the other end of which shaft is rotatably supported in a bracket 509 positioned near and to one side of the lamp assembly 453, 455. An arm 511 secured to the rock shaft 473 projects outwardly therefrom and is provided with a slot 513 adjacent its free end. A similar arm 515 carried by the shaft 507 is provided with a pin 517 adjacent its outer end which passes through the slot 513 for the purpose of mechanically coupling the two shafts 473 and 507 together. It will be seen that by the arrangement of parts just described the oscillatory motion of the shaft 473 will be transmitted to the shaft 507. The forward end of the shaft 507 immediately behind the bracket 509 has mounted thereon a pair of shutter operating arms 519 which project outwardly from the shaft 507 and the ends of which are turned laterally as at 521. A bracket 523 secured to the base plate 451 serves to support adjacent its upper end a rock shaft 525 from which there projects laterally a shutter member 527 including a shutter arm 529 and a shutter proper 531. The two laterally extending portions 521 of the operating arms 519 straddle the shutter arm 529 in such a manner that upon oscillation of the shaft 507 these lateral portions of the operating arms 519 are adapted to alternately engage the shutter arm 529 to bring the shutter 531 directly in front of the light source or lamp $l$ and block the rays of light issuing therefrom. The laterally extending portions 521 of the shutter operating arms 519 are spaced apart a distance somewhat greater than the width of the shutter arm 529 so that a considerable degree of lost motion exists between the movements of the shutter and of the shutter operating arms. By such an arrangement, the shutter is maintained out of registry with the lamp $l$ during the movement of the movable mirror 461 at the commencement of its stroke. The movements of the shutter 531 and of the mirror 461 are so correlated that the net result consists of a flash of light which appears on the screen 16 each time a tracer shot is fired. This flash alternately sweeps inwardly from the sides of the screen 16 and converges toward the spots of light which simulate the tracer shots on the screen. These flashes of light are observed by the operator seated in the turret compartment of the free gun assembly 10 on opposite sides of the two free gun units.

A cover plate or casing 533 including side walls 535, a top wall 537 and a rear wall 539 is provided for the mechanism just described. The front end of the casing 533 is open in the upper regions of the casing and a shield 541 is associated with the casing 533 to restrict issuance of light from the lamp $l$ and confine the light to the mirror 461. The passage of light from the lamp $l$ and its deflection by the mirrors 461 and 463 onto the screen 16 is graphically illustrated by means of small arrows in Fig. 25. As shown in Fig. 1, the muzzle flash unit 449 is mounted on the gun mount cradle 22 between the two free guns 18, suitable attaching means 543 being provided for the purpose, and in such a position that it will not interfere with the gun sight assembly 20. Thus it will be seen that the training movements of the gun cradle will be shared by this muzzle flash unit.

Referring now to Fig. 29 wherein the electrical circuit for the apparatus is illustrated, the power for operating the various electrical instrumentalities associated with the apparatus is derived from a suitable source of current supply S. Upon closure of the main or power switch PS, current is made available for operation of the trace trainer projector 24, the muzzle flash unit 35, and the loud speakers LS. After the switch PS has been closed, closure of the motor switch MS closes the motor circuit leading from the source S through lines $a$, $b$, switch PS, line $c$, the motor M, switch MS, line $d$, the switch PS, and lines $e$ and $f$ to the source S. Closure of the light switch LSW completes a circuit through lines $a$, $b$, switch PS, lines $c$, $m$, $n$, the lamp L in the light tube assembly 350, the switch LSW, lines $o$, $d$, switch PS and lines $e$, $f$, to the source S.

Current is made available to the turret motor M1 whenever either of the trigger contacts $tc$ are closed through the lines $a$, $g$, $h$, contacts $tc$, motor M1, and lines $j$, $k$, $f$ to the source S. Simultaneously with the closing of either trigger contact $tc$, the trigger magnet TM becomes energized through the circuit leading from the source S through lines $a$, $g$, $h$, line $l$, contacts $tc$, jacks P, trigger magnet TM, jacks P1 and lines $j$, $k$, $f$ to the source S.

Upon energization of the magnet TM, a pair of contacts $tmc1$ become closed to complete a circuit through lines $a$, $b$, switch PS, lines $c$, $m$, resistor R, Bowden wire magnet BM (see also Fig. 8), contacts $tmc1$, line $o$, switch MS, line $d$, switch PS and lines $e$ and $f$. Energization of the magnet serves to release the latch assembly 450, 452, (Fig. 8) to allow the roller 436 to ride on the periphery of the cam 438, in the manner previously described, to periodically actuate the paper piercing needle 370 of the light tube assembly 350. Such actuation of the needle 370 continues during such time as either of the trigger contacts $tc$ remain closed.

Simultaneously with the energization of the Bowden wire magnet BM and the consequent closing of the contacts $tmc1$, the pair of contacts $tmc2$ become closed, thus permitting a circuit to be set up each time the loud speaker contacts $lsc$ become closed under the influence of the cam 438. The circuit just mentioned exists from the negative side of a rectifier unit RU through lines $p$, $q$, $r$, the resistor-condenser combinations $rc1$ and $rc2$, jacks P2 and P4, the parallel arrangement of loud speaker primary coils for the speakers LS, the common jack P3, contacts $tmc2$, loud speaker contacts $lsc$, the manually operable noise switch NS and lines $s$ and $t$ to the positive side of the rectifier unit RU.

The circuit for the lamp $l$ in the muzzle flash unit 35 exists through lines $a$, $g$, $aa$, the primary winding $pw$ of a six-volt transformer T, a manually operable switch SW, lines $bb$, $k$ and $f$. The secondary winding $sw$ of the transformer T and the filament of the lamp $l$ exists in a secondary circuit.

The oscillating mirror 461 of the muzzle flash unit 35 is set into operation under the control of the two solenoids 479 and 481, the windings of which are designated MF1 and MF2 (see also Fig. 27), which are adapted to become alternately energized under the initial control of the intermittently operable Bowden wire contacts $bmc$ (Fig. 8) which are actuated by rotation of the cam 438, as previously described, and under the control of a plurality of magnets. Toward this end, upon momentary closing of the contacts $bmc$, a circuit is established from the negative side of the rectifier unit RU through line $p$, resistor R1, jacks P5, solenoid MF2, jacks P6, magnet MF4, line $u$, normally closed contacts $mfc5a$, normally closed side of the contact group $mfc3a$, lines $v$, $w$, $x$, Bowden wire contacts $bmc$, lines $y$ and $t$ to the positive side of the rectifier unit RU.

Upon energization of the magnet MF4, the pair of contacts $mfc4a$ become closed, thus allowing current to flow through lines $p$, $q$, resistor R2, magnet MF5, contacts $mfc4a$, contacts $mfc3b$ and line $t$ to the rectifier unit RU.

Upon energization of the magnet MF5, contacts $mfc5b$ close to form a holding circuit for the magnet MF5 until such time as the contacts $mfc3b$ become again open and contacts $mfc5a$ become open. In the meantime, the normally closed and the normally open contacts of the contact group $mfc4b$ shift to prevent the magnet MF3 from becoming energized when the contacts $mfc5c$ become closed, thus maintaining the solenoid MF2 energized until such time as the Bowden wire contact $bmc$ again becomes open.

Upon subsequent closure of the contacts $bmc$, current flows through line $p$, resistor R1, jacks P5, solenoid MF1, jacks P7, magnet MF3, contacts $mfc5c$, normally closed side of contacts $mfc4b$, lines $z$, $w$, $x$, contacts $bmc$ and lines $y$, $t$ to the rectifier unit RU. Energization of the solenoid MF1 causes shifting of the position of the oscillatable mirror 461 of the muzzle flash unit 25.

Upon energization of the magnet MF3, contacts $mfc3b$ become open and the magnet MF5 becomes deenergized, thus opening contacts $mfc5b$ and $mfc5c$, while causing contacts $mfc5a$ to close to reset the circuit to the condition shown in Fig. 29.

Contacts $mfc3a$ shift their positions to prevent magnet MF4 from becoming energized when the contacts $mfc5a$ become closed and to maintain the solenoid MF1 energized until such time as the contacts $bmc$ become open.

The circuit action just described is continuous as long as either of the trigger contacts $tc$ remain closed.

The magnets MF3, MF4 and MF5 are located on a panel board (not shown) contained within the cabinet 40 upon which the trace trainer projector proper is mounted.

The loud speakers LS depend for their operation upon the discharging action of the condensers in the resistor-condenser combinations $rc1$ and $rc2$. These condensers discharge through their respective resistors and into the loud speaker circuit.

The circuit for the magnet 38 which controls the operation of the shutter 36, by means of which the instructor is enabled to blank out the lead image on the screen, is illustrated in Fig. 29. This circuit includes a step-down transformer T', the primary winding of which is connected directly to the source S and the secondary winding of which is placed in series with the magnet 38. The push button 39 contained in the secondary circuit is adapted upon being depressed to complete the circuit and energize the magnet 38, thus swinging the shutter 36 to a position wherein it intercepts the beam of light issuing from the light tube 34.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intension, therefore, to be limited only as indicated by the scope of the following claims.

What is claimed is:

1. The method of artificially producing visual effects on a projection screen representative of tracer projectile firing which consists in successively forming registering apertures in a plurality of contiguous opaque sheets of blank material and thereafter moving said sheets in different directions each in its own plane, projecting a beam of light through each aperture formed in the composite sheets and onto a projection screen immediately after each forming operation thus causing said beam to gradually close-off by virtue of the relative movement of said sheets.

2. In an apparatus for artificially producing visual effects on a projection screen representative of tracer projectile firing, a light source positioned in front of the screen, tracer blank media positioned between said light source and the screen and having an area thereof correlated with the effective area of the screen, said tracer blank media in the correlated area thereof consisting of a pair of sheets of relatively thin opaque paper material arranged in contiguous face-to-face relationship and movable in different directions, means for moving said sheets of paper material, and means for repetitiously punching registering apertures in selected regions of the composite tracer blank media to allow light issuing from said source to pass through the same, fall upon said projection screen, and attain a condition of close-off.

3. In an apparatus for artificially producing visual effects on a projection screen representative of tracer projectile firing, a light source positioned in front of the screen, tracer blank media positioned between said light source and the screen and having an area thereof correlated with the effective area of the screen, said tracer blank media consisting of a pair of sheets of relatively thin opaque paper material arranged in contiguous face-to-face relationship and movable in different directions, a movable punch positioned in close proximity to said correlated area of the composite tracer blank media and movable from a retracted position out of contact with the media to an advanced position wherein it penetrates the latter to create an aperture completely therethrough in the correlated area thereof, means for shifting the position of said punch bodily to bring the same into register with a selected localized area of the tracer blank media, means for actuating said punch in any of its shifted positions, and means for moving said sheets of paper material.

4. In an apparatus for artificially producing visual effects on a projection screen representative of tracer projectile firing, a light source positioned in front of the screen, tracer blank media positioned between said light source and the screen and having an area thereof correlated with the effective area of the screen, said tracer blank media consisting of a pair of sheets of relatively thin opaque paper material arranged in contiguous face-to-face relationship and movable in different directions, said tracer blank media in the correlated area thereof consisting of four sheets of relatively thin opaque paper material arranged in adjacent face-to-face layers, two of said paper layers being movable in opposite directions and two other layers also being movable in opposite directions at right angles to the directions of movement of said first mentioned two paper layers, means for moving said sheets of paper material, and means for repetitiously punching registering apertures in selected regions of the composite tracer blank media to allow light issuing from said source to pass through the same, fall upon said projection screen and attain a condition of close-off.

5. In an apparatus for artificially producing visual effects on a projection screen representative of tracer projectile firing, a light source positioned in front of the screen, tracer blank media positioned between said light source and the screen and having an area thereof correlated with the effective area of the screen, said tracer blank media consisting of a pair of sheets of relatively thin opaque paper material arranged in contiguous face-to-face relationship and movable in different directions, said tracer blank media in the correlated area thereof consisting of four layers of relatively thin opaque paper material arranged in face-to-face relationship and movable in different directions, a movable punch positioned in close proximity to said correlated area of the composite tracer blank media and movable from a retracted position out of contact with the media to an advanced position wherein it penetrates the four layers of the tracer blank media to create registering apertures therethrough, means for shifting the position of said punch bodily to bring the same into register with a selected area of the tracer blank media, means for actuating said punch in any of its shifted positions, and means for simultaneously moving said sheets of paper material.

6. The combination with a projection screen and a projector for projecting moving targets on said screen, of a dummy weapon positioned in front of said screen and having a tiltable gun mount capable of both horizontal and elevational movements, a train projector positioned behind said dummy weapon and including a movable light source adapted to project a beam of light onto said screen, supporting means for said light source including a tiltable elevational train cradle and a horizontal train cradle capable of horizontal swinging movements, and means connecting said gun mount to said cradles for controlling the movements of the latter and for correlating them with the elevational and horizontal movements of the gun mount.

7. The combination with a projection screen and a projector for projecting moving targets on said screen, of a dummy weapon positioned in front of said screen and having a tiltable gun mount capable of both horizontal and elevational movements, a train projector positioned behind said dummy weapon and including a movable sub gun capable of both horizontal and elevational training movements, means connecting said gun mount to said sub gun for controlling the movements of the latter and for correlating them with the elevational and horizontal movements of the former, a movable light source capable of projecting a beam of light on said screen, supporting means for said light source including a horizontal train cradle and elevational train cradle, said elevational train cradle being pivoted for swinging movement in a vertical plane and said horizontal train cradle being pivoted for swinging movement in a horizontal plane, and means operatively connecting the sub gun to said cradles for controlling and correlating the movements of the latter.

8. The combination with a projection screen and a projector for projecting moving targets on said screen, of a dummy weapon positioned in front of said screen and having a tiltable gun mount capable of both horizontal and elevational movements, a train projector positioned behind said dummy weapon and including a movable light source, opaque tracer blank media positioned between said movable light source and the screen and having an area thereof correlated with the effective area of the screen, means movable bodily with the light source for punching relatively small apertures in said correlated area of the tracer blank media in selected regions thereof to allow light issuing from said source to pass through said apertures and fall upon the screen, supporting means for said light source and punching means including an elevational train cradle pivoted for swinging movement in a vertical plane and a horizontal train cradle pivoted for swinging movement in a horizontal plane, means connecting said gun mount to said cradles for controlling and correlating the movements of the latter, and means for actuating said punching means.

9. In an apparatus for artificially producing visual effects on a projection screen which are representative of tracer projectile firing, a movable light source positioned in front of the screen, supporting means for said light source including an elevational train cradle pivoted for swinging movement in a vertical plane and a horizontal train cradle pivoted for swinging movement in a horizontal plane, said cradles forming the sole support for said light source, and means for moving said cradles.

10. In an apparatus for artificially producing visual effects on a projection screen which are representative of tracer projectile firing, a movable light source positioned in front of the screen, opaque tracer blank media positioned between said light source and screen and having an area thereof correlated with the effective area of the screen, punching instrumentalities movable bodily with the light source and capable of periodically punching relatively small apertures in said correlated area of the tracer blank media in selected regions thereof, supporting means for said light source and punching instrumentalities comprising an elevational train cradle capable of swinging movements in a vertical plane and a horizontal train cradle capable of swinging movements in a horizontal plane, said cradles forming the sole support for said light source and punching instrumentalities, means for moving said cradles, and means operable during movement of the elevational train cradle for shifting the latter bodily in a longitudinal direction to compensate for the effects of spherical aberration between the light source and screen.

11. In an apparatus for artificially producing visual effects on a projection screen which are representative of tracer projectile firing, a movable light source positioned in front of the screen, opaque tracer blank media positioned between said light source and screen and having an area thereof correlated with the effective area of the screen, punching instrumentalities movable bodily with the light source and capable of periodically punching relatively small apertures in said correlated area of the tracer blank media in selected regions thereof, supporting means for said light source and punching instrumentalities comprising an elevational train cradle capable of swinging movements in a vertical plane and a horizontal train cradle capable of swinging movements in a horizontal plane, said cradles forming the sole support for said light source and punching instrumentalities, means for moving said cradles, means operable during movement of the elevational train cradle for shifting the latter bodily in a longitudinal direction to compensate for the effects of spherical aberration between the light source and screen, and means operable during movement of said horizontal train cradle for shifting said light source and punching instrumentalities bodily in a longitudinal direction to further compensate for the effect of spherical aberration between said light source and the screen.

12. In an apparatus for artificially producing visual effects on a projection screen which are representative of tracer projectile firing, a movable light source positioned in front of the screen, opaque tracer blank media positioned between said light source and screen and having an area thereof correlated with the effective area of the screen, punching instrumentalities movable bodily with the light source and capable of periodically punching relatively small apertures in said correlated area of the tracer blank media in selected regions thereof, supporting means for said light source and punching instrumentalities comprising an elevational train cradle capable of swinging movements in a vertical plane and a horizontal train cradle capable of swinging movements in a horizontal plane, said cradles forming the sole support for said light source and punching instrumentalities, means for moving said cradles, means operable during movement of the elevational train cradle for shifting the latter bodily in a longitudinal direction to compensate for the effects of spherical aberration between the light source and screen, and means formed on said elevational train cradle for shifting said punching instrumentalities and light source bodily in a longitudinal direction during movement of the horizontal train cradle to further compensate for the effect of spherical aberration between said light source and the screen.

REYNOLD B. JOHNSON.

REFERENCES CITED

The following references are of record in the file of this patent:

UNITED STATES PATENTS

| Number | Name | Date |
| --- | --- | --- |
| 2,287,429 | Hooker | June 23, 1942 |
| 2,139,210 | Sauerbier | Dec. 6, 1938 |
| 2,139,530 | Vivaudou | Dec. 6, 1938 |
| 1,319,698 | De Brayer | Oct. 28, 1919 |
| 1,414,942 | Gill | May 2, 1922 |
| 1,910,540 | Hammond | May 23, 1933 |
| 2,335,257 | Binks | Nov. 30, 1943 |
| 2,098,873 | Kuppenbender | Nov. 9, 1937 |
| 2,089,901 | Kollmayer | Aug. 10, 1937 |
| 2,023,497 | Trammell | Dec. 10, 1935 |
| 1,526,781 | Ferree | Feb. 17, 1925 |
| 54,997 | Alger | May 22, 1866 |
| 1,472,964 | Donnell | Nov. 6, 1923 |
| 2,364,720 | Jones | Dec. 12, 1944 |
| 2,375,004 | Knowles | May 1, 1945 |
| 2,373,024 | Gunn | Apr. 3, 1945 |
| 2,373,313 | Jeandron | Apr. 10, 1945 |